United States Patent [19]

Li

[11] Patent Number: 5,038,386
[45] Date of Patent: Aug. 6, 1991

[54] POLYMORPHIC MESH NETWORK IMAGE PROCESSING SYSTEM

[75] Inventor: Hungwen Li, Monte Sevenoe, Calif.

[73] Assignee: International Business Machines Corporation, Armonk, N.Y.

[21] Appl. No.: 208,850

[22] Filed: Jun. 20, 1988

Related U.S. Application Data

[63] Continuation of Ser. No. 902,343, Aug. 29, 1986, abandoned.

[51] Int. Cl.⁵ .......................................... G06K 9/54
[52] U.S. Cl. ...................................... 382/49; 382/27; 382/41; 364/900
[58] Field of Search .......................... 382/27, 41, 49; 364/900 MS File, 736, 715, 140, 153

[56] References Cited

U.S. PATENT DOCUMENTS

| | | | |
|---|---|---|---|
| 3,106,698 | 10/1963 | Unger | 382/49 |
| 4,174,514 | 11/1979 | Sternberg | 340/146.3 |
| 4,215,401 | 7/1980 | Holsztynski et al. | 364/200 |
| 4,380,046 | 4/1983 | Fung | 364/200 |
| 4,398,176 | 8/1983 | Dargel et al. | 382/27 |
| 4,484,349 | 11/1984 | McCubbrey | 382/49 |
| 4,601,055 | 7/1986 | Kent | 382/49 |

OTHER PUBLICATIONS

S. R. Sternberg, Biomedical Image Processing, Computer, Jan. 1983 pp. 22–34.
J. L. Turney et al, Recognizing Partially Occluded Parts, IEEE Transactions on Pattern Analysis and Machine Intelligence, Jul. 1985, pp. 410–421.
T. N. Mudge et al, Efficiency of Feature Dependent Algorithms for the Parallel Processing of Images, IEEE 0190-3918/83/0000/0369, pp. 369, 373.
S. R. Sternberg, Industrial Morphology, SPIE, vol. 504, Applications of Digital Image Processing VII, (1984), pp. 202–213.
D. E. Shaw et al, "The Multiple-processor PPS chip of the Non≧Von 3 Superconductor", Internal Report, Columbia University, Aug. 1982, pp. 161–174.
M. J. Kimmel, R. S. Jaffe, J. R. Mandeville and M. A. Lavin, "MITE:Morpic Image Transformer Engine An Architecture for Reconfigurable Pipelins of Neighborhood Processors", IBM RC11438, Oct. 10, 1985.
A. J. Kessler and J. H. Patel, "Reconfigurable Parallel Pipelines for Fault Tolerance", IEEE, CH1813-5/82/0000/0118, 1982.
S. R. Sternberg, "Parallel Architecture for Image Processing", IEEE CH1515/-6/79/0000-0712, 1979.
T. N. Mudge, E. J. Delp, L. J. Siegel and H. J. Siegel, "Image Coding Using the Multimicroprocessor System PASM¹", IEEE, 82CH1761-6/82/0000/0200, 1982.
S. R. Sternberg, "Language and Architecture for Parallel Image Processing", *Pattern Recognition In Practice*, North–Holland Publ. Co. 1980.

*Primary Examiner*—C. L. Albritton
*Assistant Examiner*—Lincoln Donovan
*Attorney, Agent, or Firm*—Philip J. Feig

[57] ABSTRACT

Polymorphic mesh uses physical mesh connection to form twelve useful connection patterns for each of the processing elements making up an image procssor of cellular automata under software control. Each processing element includes a limited mesh of interconnections to related processing elements. This provides for programmable choice of network configuration. The limited mesh of network interconnection is controlled by information stored in a register within the affected processing element. The interconnection pattern controlled by this information is invoked by programming, or by the combination of programming and process data, so as to configure the network of processing elements dynamically in the desired mesh. Representative configurations are:

string; mesh; tree; cube; pyramid.

11 Claims, 9 Drawing Sheets

FIG. 16
FIG. 17
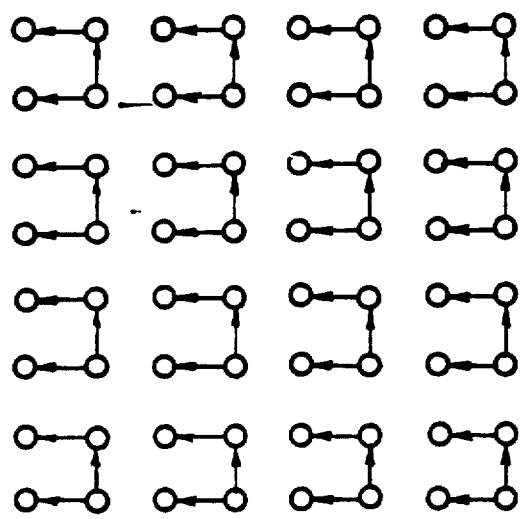
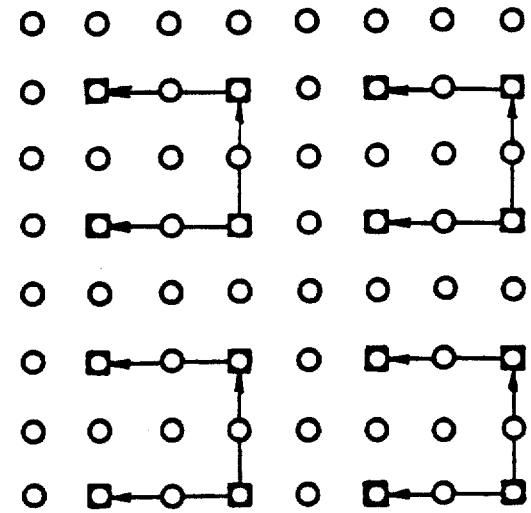
FIG. 18
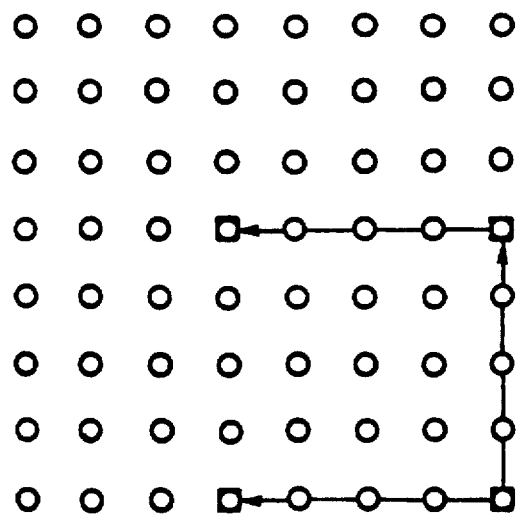

POLYMORPHIC MESH NETWORK IMAGE PROCESSING SYSTEM

This application is a continuation of application Ser. No. 06/902,343, filed Aug. 29, 1986 now abandoned.

BACKGROUND OF THE INVENTION

1. Field of the Invention

This invention relates to an array processor made up of a network of processing elements, and more particularly relates to an array processing network in which each processing element in the array of processing elements is equipped with a program-accessible connection control mechanism with a controllable limited mesh of interconnections to related processing elements, so as to provide a programmable choice of network configuration.

2. Description of the Prior Art

The following publications are representative of the prior art:

Published Articles

1. Sternberg, "Biomedical image processing," Computer, January 1983, shows an array of cellular automata of identical cells connected to their nearest neighbor for iterative neighborhood processing of digital images. A serpentine shift register serially configures neighborhood inputs to the 3×3 neighborhood.
2. Turney et al., "Recognizing Partially Occluded Parts," IEEE Transactions on Pattern Analysis and Machine Intelligence, July 1985, pp. 410–421, shows the use of a variety of techniques including Hough transform, and weighted template matching.
3. Mudge et al., "Efficiency of Feature Dependent Algorithms for the Parallel Processing of Images," IEEE 0190-3918/83/0000/0369 1983, 369–373, shows how the architecture of an image processing system can benefit from configuration as multiple subimage processors in which processing elements communicate through some form of communication network. The authors explore the difference between feature-dependent algorithms and feature-independent algorithms.
4. Sternberg et al., "Industrial Morphology," shows the combination in a single system of image processing and of pattern recognition.
5. D. E. Shaw, "The NON-VON Supercomputer," internal report, Columbia University, August 1982, shows a massively parallel system with an I/O switching in each processing element and with flag registers to activate and deactivate individual PEs.
6. M. J. Kimmel, R. S. Jaffle, J. R. Mandeville, and M. A. Lavin, "MITE:Morphic Image Transform Engine, An Architecture for Reconfigurable Pipelines of Neighborhood Processors, IBM RC11438, Oct. 10, 1985, shows a reconfigurable network of processing element capable of a variety of interconnections of Pe to PE via bus connections under operator control.
7. A. J. Kessler and J. H. Patel, "Reconfigurable Parallel for Fault Tolerance," IEEE, CH1813-5/82/0000/0118, 1982, shows reconfigurable pipeline connection for graceful degradation.
8. S. R. Sternberg, "Parallel Architecture for Image Processing," IEEE, CH1515-6/79/0000-0712, 1979, shows a PE network with full connectivity.
9. T. N. Mudge, E. J. Delp, L. J. Siegel and H. J. Siegel, "Image Coding Using the Multimicroprocessor System PASM," IEEE, 82CH1761-6/82/0000/0200, 1982, shows processing element interconnection by an interconnection network.
10. S. R. Sternberg, "Language and Architecture for Parallel Image Processing,;" Pattern Recognition in Practice, North-Holland Publishing Co., 1980, shows a complex network of PEs and explains operation.

Patents

U.S. Pat. No. 4,174,514, Nov. 13, 1979, shows an array processor with adjacent neighborhood processing elements interconnected for mutual access to the image data in overlap areas of two adjacent image slices.

U.S. Pat. No. 4,215,401, CELLULAR DIGITAL ARRAY PROCESSOR, Jul. 29, 1980, shows an array processor in which each processing element "cell" includes two accumulators arranged to connect that cell (except those at the array edge) with its two neighboring cells along one axis with its two neighboring cells along the orthogonal axis.

U.S. Pat. No. 4,380,046, Fung, MASSIVELY PARALLEL PROCESSOR COMPUTER, Apr. 12, 1983, shows an image processor which performs spatial translation by shifting or "sliding" of bits vertically or horizontally to neighboring processing elements, P register to P register, as permitted by another register, called G register. Each processing element includes an arithmetic, logic and routing unit (ALRU), an I/O unit and a local memory unit (LMU). The ALRU constitutes three functional components, a binary counter/shift register subunit, a logic-slider subunit (P register) and a mask subunit (G register).

U.S. Pat. No. 4,398,176, Dargel et al., DATA ANALYZER WITH COMMON DATA/INSTRUCTION BUS, Aug. 9, 1983, shows an image processing array in which each processing element includes external command control lines to control whether bus information is to be used as instruction or as data. Each processing element also includes mechanism to determine from the bit structure of an instruction whether the instruction is local or global, and to stop forward transmission if local.

U.S. Pat. No. 4,601,055, Kent, IMAGE PROCESSOR, July 15, 1986, shows an iconic-to-iconic low level image processor with pixel-by-pixel forward transformation and with pixel-by-pixel retrograde transformation.

The prior art provides for permanent configuration of processing elements in a pipeline or other pattern image processing system. The prior art provides for reconfiguration of an image processing system via switching networks and busses. The prior art provides for convenient bit transfer to adjacent processing elements. The prior art does not however, teach nor suggest the invention, which provides for very high speed switching within the processing element, programmable as a polymorphic mesh, so as to optimize dynamically the configuration to the data being processed in a configuration such as: string; mesh; tree; cube; pyramid.

Cellular automata has been found very useful for image processing, computer vision and other computations in physics. All existing interconnection networks for cellular automata assume a fixed pattern such as a string, a mesh, a tree, a cube or a pyramid, etc. Each pattern is good for certain types of computing but is poor for computations that do not match the pattern. Since the network interconnection pattern is built in, it is fixed; it can be changed even when a mismatched is detected. The mismatch leads to poor efficiency.

For example, an N×N mesh is an optimal interconnection for local operations in image processing, but its performance is poor in computing a global operation (e.g. it takes N cycles to compute MINIMUM, a linear complexity). On the other hand, a tree interconnection is optimal for computing MINIMUM (it takes only log N cycles, a logarithmic complexity) but is very inefficient in computing the local operations of an image because of the lack of the neighborhood connection.

Besides the general inefficiency in computing when the interconnection does not match the algorithm, the fixed-pattern approach is inflexible in designing an algorithm. This is mainly caused by the restriction in the data flow. For example, in the string interconnection, the data flows in one direction only, from left to right. Such a restriction confines the algorithm domain; only the algorithms that have a "string" data flow can be benefit from the "string" network. In this regard, the fixed networks are very special-purpose and have a very narrow range of applications.

Another disadvantage of the fixed interconnection pattern is that it does not support efficiently iconic and intermediate processing simultaneously. Such disadvantage is specific to one important application of the cellular automata, computer vision, in which both iconic (or image) processing and the transformation from iconic to symbolic information (called intermediate level processing) are two integral parts. A serious implication of this disadvantage is the I/O problem, because the image after iconic processing needs to be shipped outside of the network for further intermediate processing.

SUMMARY OF THE INVENTION

The object of the invention is to provide program-accessible convenient high speed connectivity to each processing element in an array, so that processing elements may be programmably grouped in an effective manner without incurring the cost of the complex connections required for universal connectivity.

Another object of the invention is to provide convenient programmable control of connectivity of each processing element in the array, so that processing elements may be prgrammably regrouped from time to time, both under adaptive control by the computer as it senses the need for optimization regrouping and under operator control as the operator foresees the need for optimization regrouping.

Another object of the invention is to provide an external memory data connection to the processing element, by which certain hardware may be eliminated and additional flexibility of operation may be gained.

A feature of the invention is the use of an array of polymorphic mesh processing elements, each of which has processing capability embodied in an arithmetic and logic unit with memory, and also has programmable connection control capability with geographic destination connections and also logical connections.

Another feature of the invention is a provision for programmable short-circuit capability in the polymorphic mesh processing element. The short-circuit capability allows a series of intervening processing elements to serve simply as wire equivalents in transmitting data form a sending PE to a remote PE without cycle delay.

Another feature of the invention is a "polymorphic-mesh network," which is a composite network of a conventional mesh external to each PE and an internal network within each PE, to accommodate standard patterns and other new useful patterns through software control so that the connection can be matched to the computing. Through the "polymorphic" feature, the network can "reshape" itself adaptively, to allow flexible algorithm design and to cover wider application spectra.

A specific feature, related to computer vision, supports the intermediate level processing (iconic to symbolic transformation) by the polymorphic mesh, resulting in an efficient architecture while avoiding the serious I/O problem.

Another specific feature of the invention is the provision of flag registers in the processing elements for use in conditional operations including reconfiguration for adaptive self-optimization and for fail-soft capability.

Another feature of the invention is the provision of a limited number of multi-bit pattern registers, each accessing a limited number of software selectable hard-wired patterns, useful in cellular automata, which can be formed by the polymorphic mesh. These patterns include bus, several trees, cube and pyramid, each of which is optimal for a related type of computation, selectable by a crossbar switch in response to a bit pattern in a selected one of the pattern registers.

An advantage of the invention is its high throughput speed at relatively low cost, achieved by providing programmable limited connectivity within the processing element, so as to permit optimization of array connection of processing elements both physically and electronically.

Another advantage is that results of intermediate level processing may be used in conjunction with programming to provide adaptive reconfiguration efficiently as a joint function of programming and intermediate results of processing. This means that intermediate data can be used to invoke an adaptive optimization regrouping function; adaptive self-optimization and fail-soft capabilities result.

Another advantage is the simplicity and two-dimension aspect of the invention, which permits vast numbers of interconnectable processing elements to be arrayed on a small number of chips.

The foregoing and other objects, features and advantages of the invention will be apparent from the more particular description of the preferred embodiment of the invention, as illustrated in the accompanying drawings.

BRIEF DESCRIPTION OF THE DRAWINGS

FIG. 12-20 are diagrams showing representative choices of array configuration conveniently achievable by programmable interconnection of polymorphic mesh processing elements.

DESCRIPTION OF A PREFERRED EMBODIMENT OF THE INVENTION

Figure 1A:
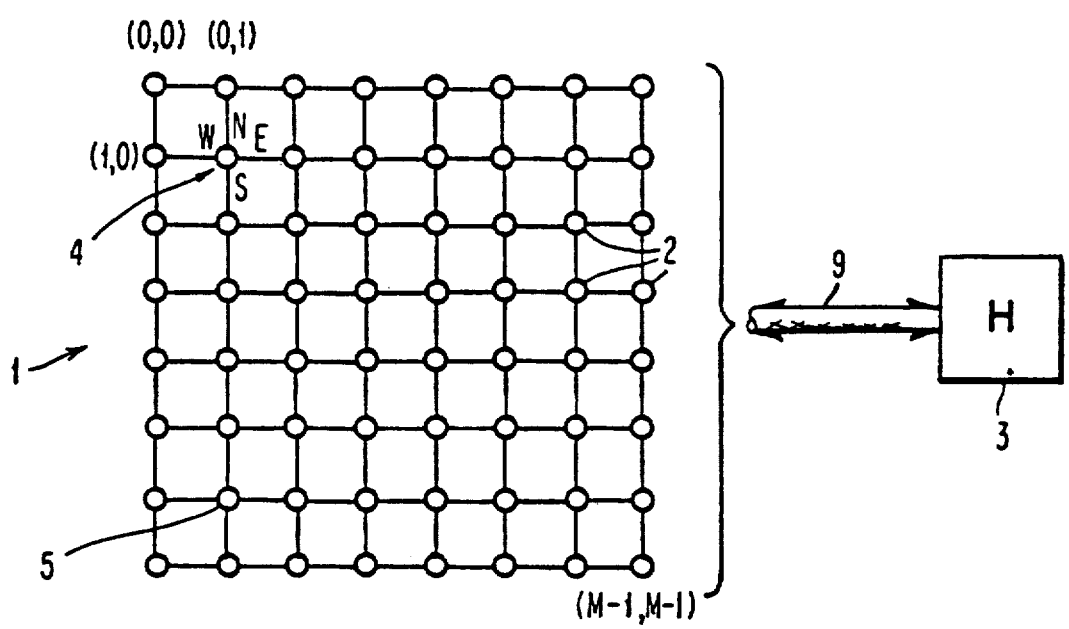
FIG. 1A is a system block diagram of an image processor comprising a network of polymorphic mesh processing elements.

FIG. 1A shows a polymorphic mesh network image processing system made up of an M×M array 1 of processing elements 2 under control of host computer H 3. Each processing element has a limited set of connections; in the preferred embodiment there are four connections, one connection to each of its adjacent orthogonal (non-diagonal) neighbors. These orthogonal neighbors will be referred to as Cartesian neighbors. These orthogonal connections are identified for processing element 4 with the directional identifications NESW. The function of these connections is to present the output of any processing element directly to a limited number of its neighbors (four in the preferred embodiment).

Figure 1B:
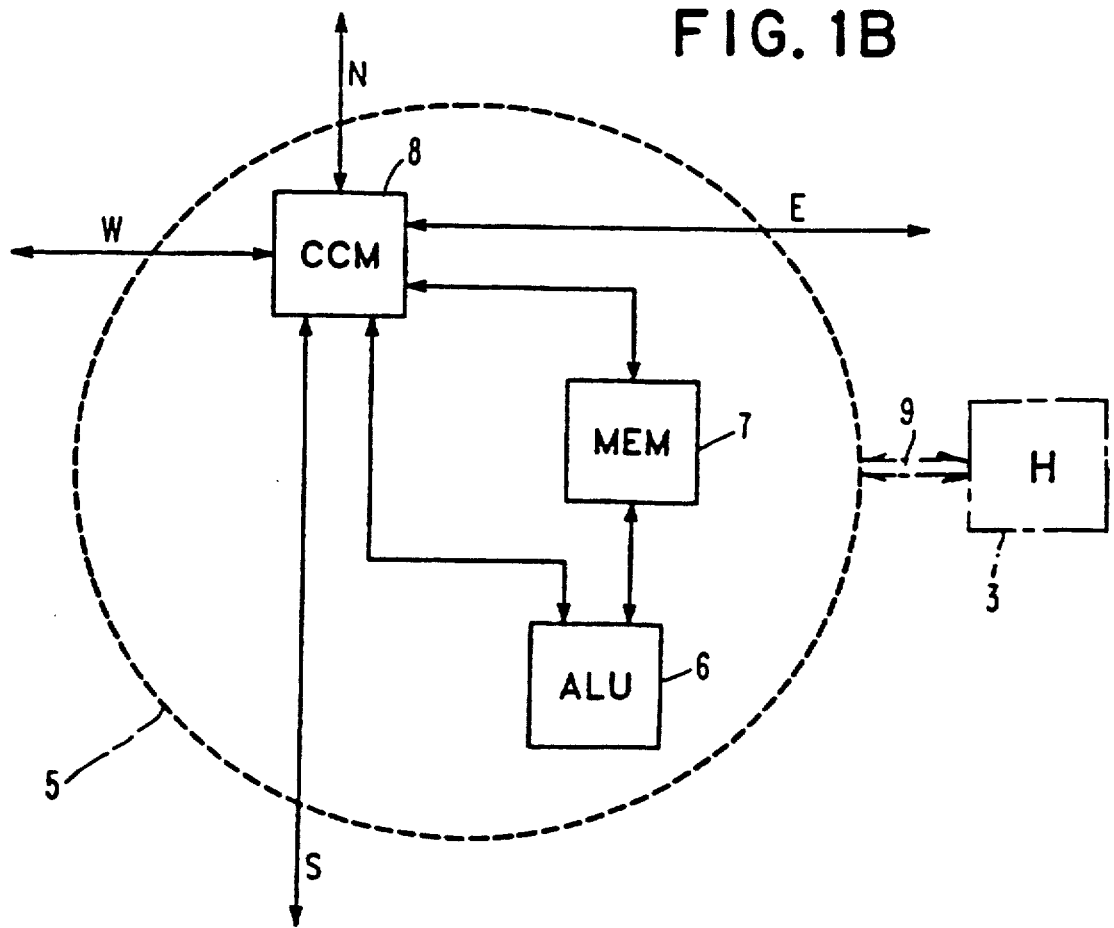
FIG. 1B is a functional block diagram of one processing element of the mesh in FIG. 1A.

One processing element is shown in greater detail in FIG. 1B. Processing element 5 is shown expanded to provide drawing space for internal organs ALU 6, MEM 7 and CCM 8 and NESW connections. Overall programming control and housekeeping control is by host computer 3, via bus 9.

Each processing element (PE) in the preferred embodiment is equipped with four Cartesian connections. These Cartesian connections are designated NESW for convenience in discussion. They connect to the respectively adjacent PEs in the designated directions. This simple mesh of Cartesian connections would be capable, without CCM 8, of making connection to the adjacent PE, which is a very important capability in image processing. This simple mesh is susceptible to convenient very large scale integration (VLSI) manufacturing.

Non-Cartesian PEs are not wired for direct connection. Diagonal connection and remote connection are not available on wires or metallization. Such connections would make manufacturing much more difficult; bundles of wires would provide bulk and distance with its inherent speed-of-light delay.

In the preferred embodiment, non-Cartesian PEs are accessed via intervening Cartesian PE's through programmed control of their respective CCM 8 capability. The CCM 8 pattern of connection is such that the input is effectively short-circuited to the desired output. Connection may follow the pattern of the chess rook (straight Cartesian with optional extension) or the chess knight with optional extension (Cartesian X, Cartesian Y = = remote off-Cartesian) but not the chess bishop (diagonal with optional extension). Complex routing patterns may be set up. Complex routing to a non-Cartesian destination may be set up to pass through a great number of PEs without cycle delay.

As an alternative to the simple Cartesian connections of the preferred embodiment, the limited set of PE-PE interconnections might also include connections to diagonally adjacent PEs. Direct connections to highly remote PEs, however, are prohibitively complex, considering that such connections can be made under program control according to this invention by combinations of Cartesian or other simple connections.

Figure 2:
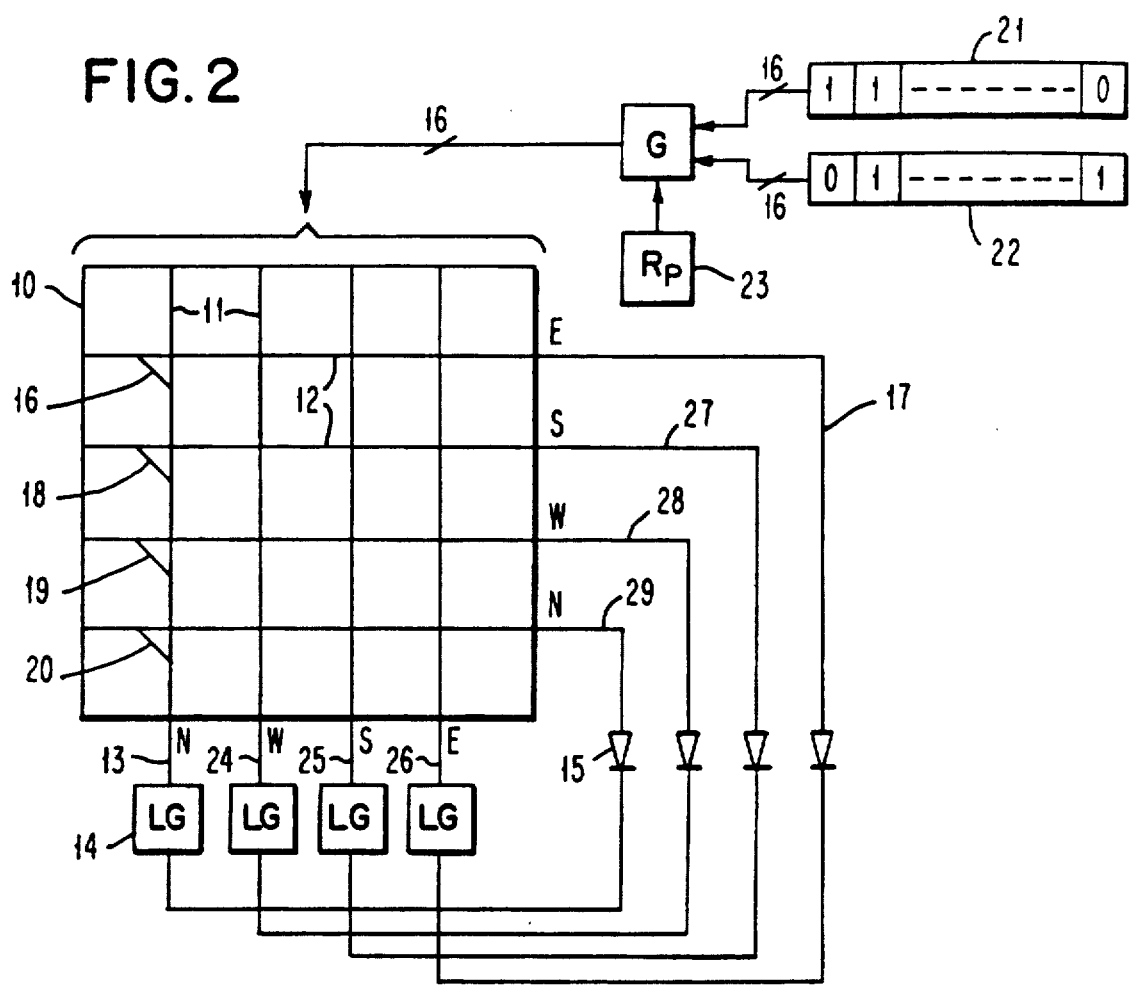
FIG. 2 is a diagram of the switching capability of the connection control mechanism CCM of a polymorphic mesh processing element.

FIG. 2 is a diagram of the switching capability of the connection control mechanism CCM 8 as shown in FIG. 1B. The essential function is as a switching network to connect any one of the connections NESW in the X crossbar with any one of the connections NESW in the Y crossbar, under control of the bit values in a pattern register. The preferred embodiment provides for selection between two pattern registers, with the selection of pattern register controlled by a bit value in a pattern selection register. Note that FIG. 2 is diagrammatic and does not show details of actual hardware. In the preferred embodiment not all of the connections available in a 4×4 matrix are necessarily used although all are indeed available. Matrix 10 is shown as having inputs 11 in the Y dimension with connections to conductor S12 in the X dimension. As shown, this is set up to connect N connector 13 via connection electronics 14 and 15 and intersection 16 to E connection 17. Different connections to SWN connections 18, 19 and 20 may be alternatively or simultaneously activated. The control is by pattern register 21 bit values or by pattern register 22 bit values. Pattern register selection is by pattern register selection register 23. Pattern registers 21 and 22 are sixteen bits each as shown by the slash on the connection line with the 16. Connections to connection lines 24, 25 and 26 are also available. Crossbar switch 10 makes any one or plurality of sixteen connections as controlled by the bit values in the selected one of pattern registers 21 or 22.

Each processing element connects to one or more of its neighbors as directed by the bit values in one of its two pattern registers. Instantaneous change of connection can be made simply by switching control to the alternate pattern register. Selection of pattern registers is by the bit value in a simple binary pattern selection register. For purposes of explanation, the pattern registers may be considered standard pattern register and alternate pattern register, respectively accessed by 1 or by 0 value in the binary pattern selection register.

Figure 3:
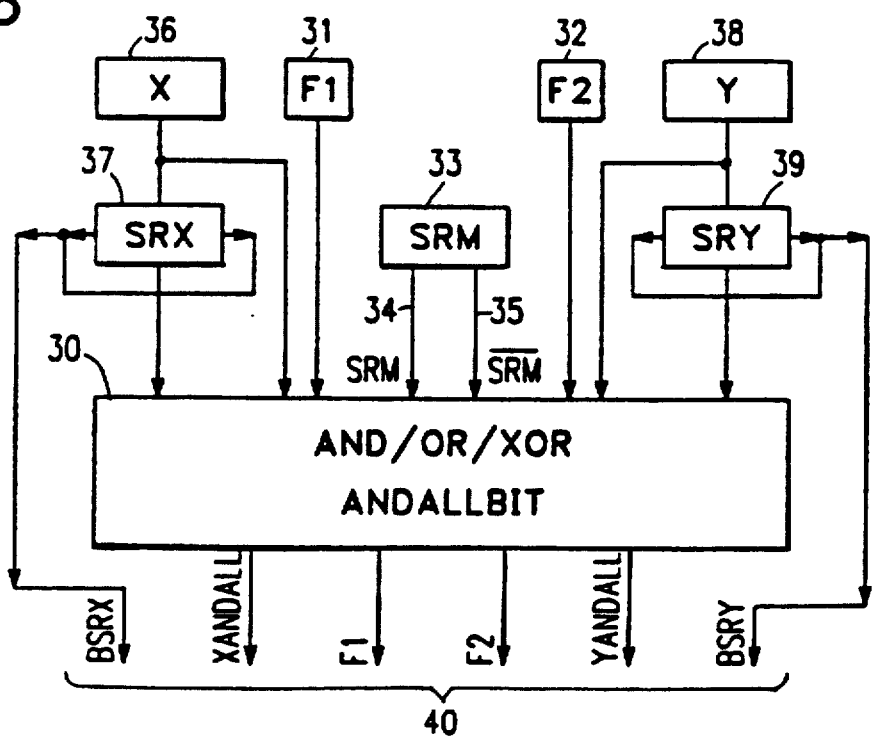
FIG. 3 is a functional block diagram of the connection control mechanism of a polymorphic mesh processing element.

FIG. 3 is a functional block diagram of CCM 8 FIG. 1, used to implement the switching capability described in FIG. 1 and also to carry out certain other direction and logical function controls. A simplified logical connective capability 30 is shown for AND, OR, XOR (Exclusive OR), and ANDALLBIT capability. Other capabilities are also available but as the complexity increases the cost increases. The connection control mechanism receives flag inputs which are stored in first flag register F1 31 and second flag register F2 32. These flags may be passed forward and may also be used to alter the control. Shift register mask 33 is provided to present outputs SRM 34 TRUE and SRM 35 COMPLEMENT, both of which are used to select a limited subset of the SRX 37 and SRY 39 bit values to control logical connective box 30.

The X register 36 and SRX shifter 37 function to control the logical connective and also the geometrical connection to a neighboring processing element. Similarly, Y register 38 and shift register Y SRY 39 function to control geometric and logical selection in the Y dimension. Usually X register 36 and Y register 38 contain the Cartesian coordinates of a processing element in the system. Shifters SRX 37 and SRY 39, in conjunction with SRM 33, are used to derive any contiguous bit group of X and Y. Detailed functions of FIG. 3 are outlined by twelve examples, formulating twelve different patterns from the polymorphic-mesh.

Each processing element is set up to carry out an arithmetical logical operation or logical transform operation on values presented to it, or, alternatively, to perform a no-op. In addition to the operation or no-op, the PE is set to connect with selected neighboring processing elements. One such connection to neighbor processing elements is to serve as short circuit. The short circuit connection is essentially instantaneous. Connection occurs at the speed of electricity (speed of light) rather than with a one-cycle delay as is common with ordinary operations, including no-op. It is thus possible to bypass several processing elements in order to make the desired connection to a processing element which is a non-adjacent Cartesian neighbor. It is possible to make a zigzag move, to make connection to a remote processing element which a neither in the same column nor in the same row. In this fashion, even through the array connections are without diagonals, connection can be made to adjacent diagonal or remote diagonal or off-diagonal remote processing elements.

While additional explanation will be made, it should be understood at this point that the polymorphic mesh image processing system, properly program controlled, can be configured to carry out a processing effort involving a complex interconnection of processing elements. Each processing element does its appropriate arithmetic or logical operation or transform operation or no-op, with respect to information provided to it, or the processing element may be short-circuit so as to be bypassed without cycle delay.

A certain amount of sophistication in connections and in connection logic might be available as a function of the number of bit values in the pattern registers and as a function of the number of pattern register, of the connection control mechanism. But such sophistication would be costly, because of the large number of replications required by the large number of processing elements. In order to keep costs of the processing element down, costs being measured in terms not only of money but of complexity and path length, the preferred embodiment has a limited repertoire of optimized connections. This repertoire is depicted in FIGS. 4 through 20.

Figure 4:
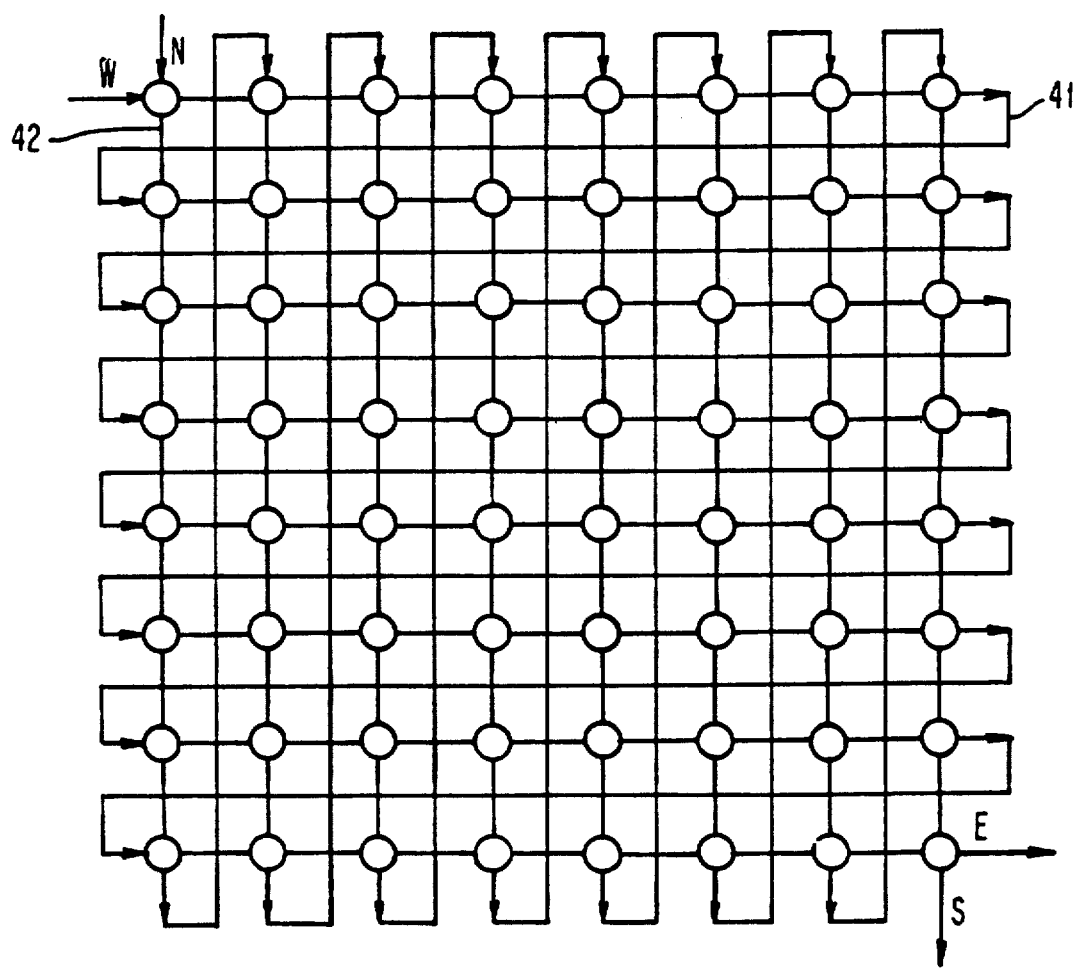
FIG. 4 is a diagram showing formation of linear string arrays from polymorphic mesh processing elements.
Figure 5:
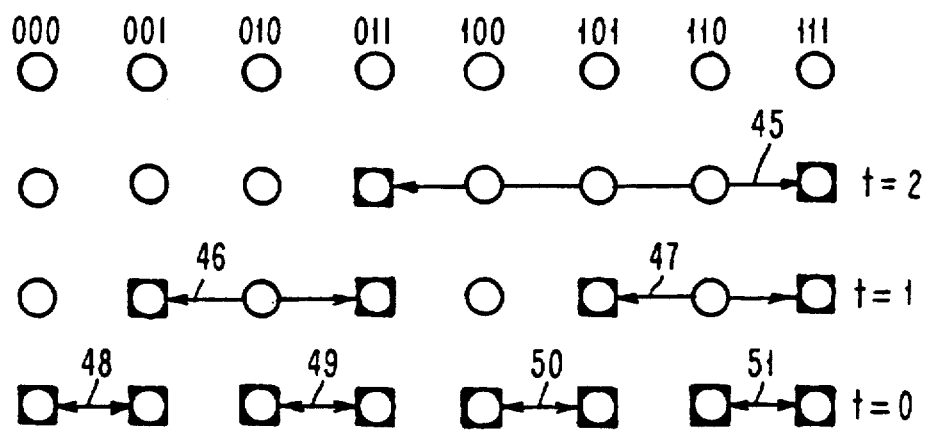
FIG. 5 is a diagram showing formation of row trees from polymorphic mesh processing elements.
Figure 6:
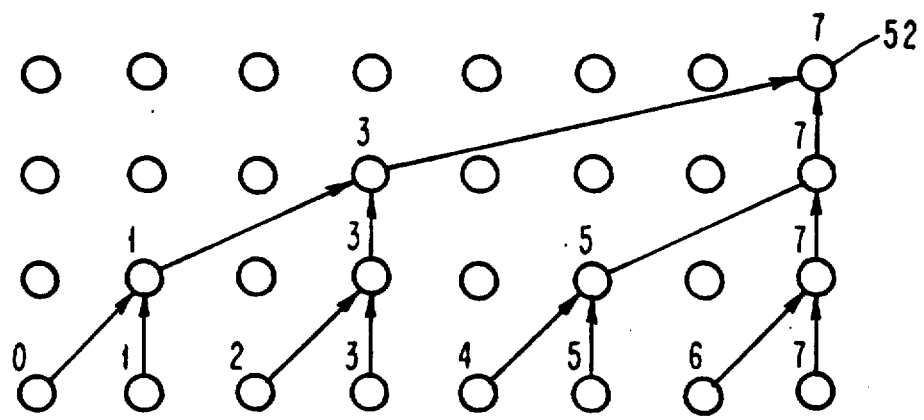
FIG. 6 is a diagram showing an alternate view of row trees.

FIG. 4 shows the formulation of linear arrays. There is a west to east linear array 41, and there is a north to south linear array 42. FIGS. 5 and 6 show two techniques for forming row trees. In the first technique, X strings 45, 46, 47 and 48 through 51 are shown in FIG. 5. These X strings of row tree are of different lengths. FIG. 6 shows a tree in its more traditional presentation as tree connection 52. In this traditional tree configuration seven inputs filter out to a single processing element in four steps.

Figure 7:
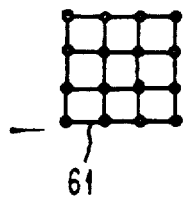
FIG. 7-10 are simplified diagrams showing chip area comparison and communication distance improvement as a result of using polymorphic mesh processing elements.
Figure 8:
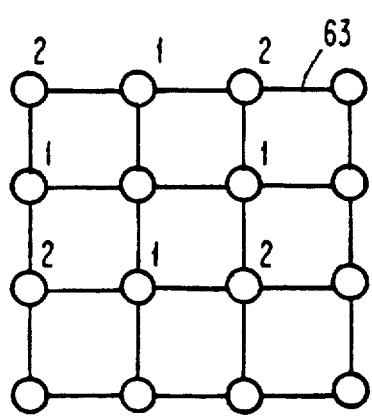
Figure 9:
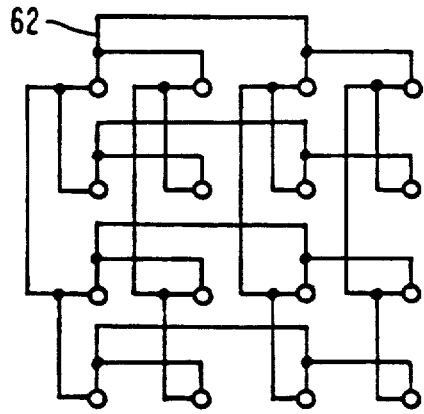

FIG. 7–10 show a chip area comparison and communication distance improvement as a result of using polymorphic mesh processing elements. The chip area for polymorphic mesh 61 as shown in FIG. 7 is quite compact as contrasted to pattern 62 of an orthogonal tree, FIG. 9. The average communication distance in a $3 \times 3$ window, as shown in FIG. 8 pattern 63, is 1.5 using the polymorphic mesh. The same $3 \times 3$ window 64 in FIG. 10 has an average communication distance of 2.125.

Figure 11:
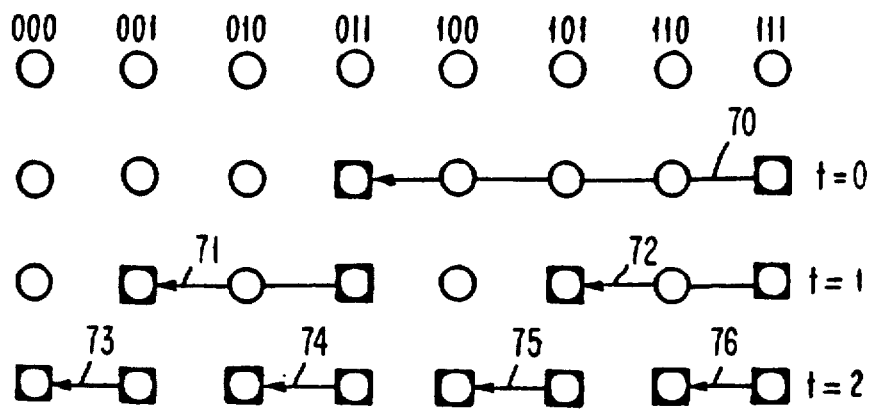
FIG. 11 is a diagram showing formulation of reverse row trees from polymorphic mesh processing elements.

FIG. 11 is a diagram showing formulation of reverse row trees from polymorphic mesh processing elements. This is very similar to row trees shown in FIG. 5. While a row tree is used to collect information from its leaves, a reverse row tree is to distribute information to its leaves.

FIGS. 12–20 show selected choices of array configuration conveniently achievable by programmable interconnection of polymorphic mesh processing elements. Certain ones of the processing elements in the figures are shown as squared circles, to indicate processing operations, as contrasted to intervening processing elements used simply for pass-through, which are shown as simple circles. Note that each PE can perform both the pass-through function and a processing operation, as programmed. Each pattern is reduced to a set of sixteen bit values and presented via the appropriate pattern register.

Figure 21:
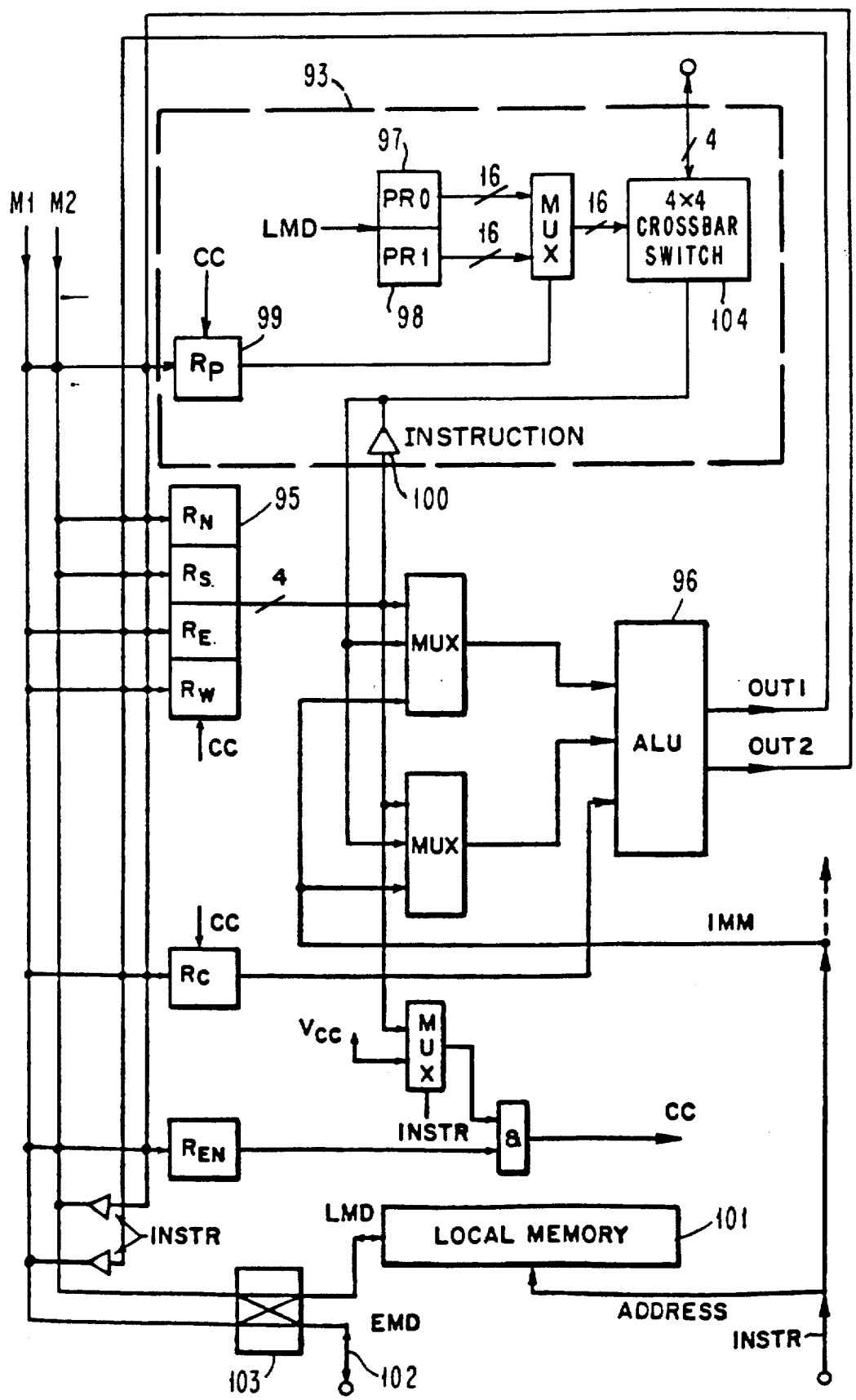
FIG. 21 is a more detailed block diagram of an individual polymorphic mesh processing element according to a preferred embodiment of the invention.

FIG. 21 is a detail of the preferred embodiment polymorphic mesh processing element according to the invention. Note that much of the mechanism shown is relative standard. This relatively standard hardware is shown outside the broken line box 93. The standard hardware features ALU 96 which provides outputs OUT1 and OUT2 as well as appropriate input multiplexes. Inputs may come via instruction terminal 94 and also registers NSE and W 95 which in turn are fed from memory 1 M1, memory 2 M2, ALU output 1 or output 2. The local memory at 101 is available for appropriate purposes of computation and housekeeping related to the ALU. The local memory 101 can be extended to the external memory whose content is fed into he processing element via an external memory data wire EMD 102. The local and external memory content are multiplexed via multiplexer 103 and connected to M1 or/and M2. Output signals out 1 and out 2 are fed back to the same processing element 93 and may be also fed to other processing element as selected by the CCM.

The EMD connection and plurality of buses M1 and M2 provide for an external memory data connection to the internal memory means, processing means and connection control mechanism, whereby the processing element may be operating with local memory and external memory simultaneously.

The connection at EMD is important, in that it permits direct connection of the individual PE to an external memory which may be in the host H 3 or may be a stand alone memory not shown. This EMD connection, not present in ordinary processing element in array processors, makes it possible to provide the equivalent of FIG. 3 from an external memory. The EMD connection also makes possible a supplement to the hardware of FIG. 3, as well as great flexibility of operation and setup of polymorphic-mesh processing element networks.

This switching capability implemented in FIG. 3 via is directional and logic function control is related to external memory and EMD 102. A wide spectrum of implementation means for FIG. 3 is possible, ranging from having all functions illustrated in FIG. 3 resident in each and every processing element to having all these function resident external to all PEs but delivering the resultant condition via connection EMD 102 to a pattern register selection register Rp 99.

Two pattern registers, PRO 97 and PR1 98, allow instantaneous switching from one connection pattern to the other without loss of any instruction cycle. The instantaneous switching is controlled by a one-bit register, the pattern register selection register (Rp 99). When it is determined that the values in one of the two pattern register are no longer necessary for use, that pattern register can be loaded with a new pattern. Such loading can be free, that is, can be carried out at the same time as the concurrent ALU operation. It must be remembered that the processing elements in image processing systems are normally one-bit processing elements, and in any case are relatively simple. It is relatively significant effort to load the pattern registers 97 and 98, which are 16 bits each. Pattern register selection register 99 must also be loaded, but this is a single bit.

There are occasions when it is necessary to close down processing to reload pattern registers 97 and 98. If this occurs it would normally take 32 cycles to load the pattern registers and a 33rd cycle to load the pattern register selection register 99. In many cases, however, there need be no time used specifically for loading the pattern registers. In the case of appropriate instructions, known to be appropriate, the operator can load one bit into the pattern register 97 or one bit into the pattern register 98 or one bit into the pattern register selection register 99. During the cycle in which ALU 96 is carrying out an arithmetic or logical operation over a period of time during which the arithmetic and logical unit 96 is operating at full capacity, it thus, maybe possible to reload one or all of the registers is CCM. Such freeloading is by a path from instruction in set 94 via multiplexes in ALU 96 and feedback from out 1 and 2, assuming appropriate setup of instruction gate 100 to carry out the loading function.

Note that the selected sixteen bit value from pattern registers 97 or 98 are to control the detailed setting of the 4×4 crossbar switch 104. Its detail can be referred to FIG. 2.

In a typical operation the processing element will be either short circuited or active. It short circuited, a pattern register such as register 97, set for short circuit connection, takes over and carries out the short circuit connection via that processing element to one or more other processing elements. In the case when the processing element is active pattern register selection register 99 would be set for action and would switch control from standard pattern register 97, set for bypass via short circuit, to alternate pattern register 98, set for directing inputs and outputs for the activity.

These activities will be explained in the following paragraphs.

The polymorphic mesh, in FIGS. 1A, 1B, 2 and 3, is capable of a number of patterns limited by the complexity of it connection control mechanism CCM. The CCM pattern repertoire, being the union of these patterns, is optimal for the union of the computing types covered separately.

One control algorithm is described in the invention or each pattern respectively. All control algorithms are simple to implement and most importantly use the same set of hardware to generate the desired pattern on-line.

A hardware mechanism is depicted in the invention to carry out the formation of all patterns in a systematical and consistent way. The mechanism is simple to implement and very suitable for VLSI implementation.

As a most distinguished feature of the polymorphic-mesh, many algorithms of linear complexity (O(N)) are reduced to logarithm complexity (O(log N)), a theoretical optimal. Therefore the N/log N speedup is gained by the architectural novelty; for a network of 1024×1024, the speedup is 100.

Specific to computer vision, after the iconic processing by one (mesh), the resulting image is not shipped outside of the network. Rather, it is further process ed by another pattern (e.g. tree) to transform the iconic information to symbolic information (e.g. how many pixels whose values are greater than 133'). Because of the polymorphic capability, the data do not have to be output, consequently the I/O rate is significantly reduced (e.g. five orders of magnitude reduction for the "how many" example in a 1024×1024 image). The saving from the I/O reduction contributes to the speedup on top of the speedup due to computing in a compound manner.

Another pattern, Diagonal-Span-Tree, can be formed by the polymorphic-mesh to facilitate the computing of $Ax+By+C$ in logarithm time where A, B and C are constant and (x,y) is the coordinate of a pixel. This capability is useful in both computer graphics and computer vision. For computer graphics, it is useful in display convex polygon in creating shadow, in clipping, in drawing spheres, in computing adaptive histogram equalization, in texture mapping and anti-aliasing. For computer vision, such a capability is useful in generating a line mask, a band mask and a polygonal mask. It is also useful in computing Fast Hough Transform and its inverse for detecting lines in a noisy image and other applications.

The preferred embodiment includes a hardware mechanism to generate twelve useful cellular automata patterns and twelve control algorithms, one for each pattern, to reshape the polymorphic-mesh into the corresponding pattern under software control. The following sections describe the polymorphic hardware mechanism and the control algorithms.

One noticeable feature of polymorphic mesh is the capability to "reshape" itself adaptive to the condition of the processing. As described previously, the pattern registers 97 and 98 can be loaded concurrently with the ALU operation; as a result, it can be considered that each PE has P patterns (P1, . . . Pp) at its disposition.

The reshaping that is adaptive to the condition C of the processing allows to each PE to assume a pattern Pi as a function C. Initially, all PEs start from a pattern, say Pi, and processing begins under the initial pattern. As processing goes, each PE senses its local condition (this can be test of convergence of a value, for example) and decides whether to stay in the current or replace it with a new pattern.

A condition can be global, meaning that the host can sense each PE condition collectively, then decide the choice of pattern and feed back to all PEs. A condition can also be local. The new pattern may be fed to an individual PE, or to a group of PEs appropriate.

Choice of a new pattern can be made in several ways.

(1) prescheduled:

a sequence of patterns (e.g. P1, P2 . . . Pp) are scheduled and will be adopted in such a priority. When the need of a new pattern is detected, (while using P1) the next pattern P(i+1) will be used. Then P(i+2) will be loaded when possible to the unused pattern register concurrent with the operation.

(2) function of C:

An example to show the adaptive reshaping is as follows:

A pattern of 3×3 window is established as Pi to allow filtering operation and an index is identified as condition C to measure the effectiveness of the filtering. The goal here is to increase the window size when C is not satisfactory. In this regard, we establish P2 as a 5×5 window, P3 as 7×7, P4 as 9×9 etc.

Another example of adaptive reshaping is the csoft fail" application. It is common to design a condition C in each PE such that a malfunction reflected. Such a condition then can be used to decide a new suitable connection pattern Pi.

POLYMORPHIC-MESH MECHANISM

The polymorphic mesh (FIG. 1A) consists of an array 1 of M×M processing elements (PE). Each PE has four physical wires communicating with four non-diagonal neighbors, one for each neighbor. These communicating wires as denoted as E, W, S and N as shown for PE 4. PE 5 is shown expanded to show arithmetic and logical unit (ALU) 6, memory (MEM) 7, and connection control mechanism (CCM) 8, ALU 6 and MEM7 are relatively standard features in image processor processing elements. The connection control mechanism is not standard, but rather is in the special configuration according to this invention.

as shown in FIG. 1B and 2, each PE consists of three functional blocks: the connection control mechanism 8, the memory block and the Arithmetic Logic Unit (ALU) block 6. The connection control mechanism 8 takes four wire (E, W, N and S), ALU output and memory MEM) as inputs and reroute them as outputs. The routing is accomplished by "SHORT_CIRCUITing" any input A (for example, 10 in FIG. 2) to any output B. The signal appears on wire A is logically as that of wire B where A and B can be any of the inputs to the connection control unit. For example, "SHORT_WE" will logically equalize wire W 24 and wire E 26.

FIG. 3 shows the functional unit of CCM 8. The action "SHORT_CIRCUIT" is conditional and the conditions are created by the connection control mechanism shown in FIG. 3. Each PE has two 1-bit flags F1 31 and F2 32 for generating condition signals. Each PE is equipped with one shift register SRM 33 which can shift in both direction logically or arithmetically and supply true and complement outputs 34 and 35.

Each PE contains a pair of registers X 36 and Y 38 where register X holds the PEs row position ($0 \leq X \leq M-1$) and register Y holds the PE's column position ($0 \leq Y \leq M-1$). Both register X and Y have a shift register SRX 37 and SRY 39, each of which can be loaded the content of X and Y respectively and can shift in both directions logically or arithmetically. The bit shifted out of SRX is BSRX and that of SRY is BSRY.

Several functions as provided to generate the condition on which the "SHORT_CIRCUIT" action is based.

LOAD reg value: this function will load the "value" into SRM, F1 or F2 via instruction or memory;

COPYSR reg: this function will copy reg X to reg SRX or Y to SRY or both

AND/OR/XOR reg: this function performs one of the following, "AND/OR/XOR" X with SRX and X with SRM (or inverted SRM); "AND-/OR/XOR" Y with SRY and Y with SRM (or inverted SRM); both of above;

ANDALLBIT reg: this function performs "AND" on all bits of reg; it produces one condition bit XANDALL if reg is X, or one condition YANDALL if reg is Y, or both condition bits.

The "SHORT₁₃CIRCUIT" action is then based on the combination of BSRX, BSRY, XANDALL, YANDALL, F1 and F2.

The remaining two functional blocks of the polymorphic-mesh are rather similar to the conventional design. The memory block can be viewed as a storage that can deliver one bit to the connection control block and/or accept one bit from it per machine cycle. The ALU, although is similar to the conventional design, features on its "conditional response to the combination of bits BSRX, BSRY, XANDALL and YANDALL in choosing a "SEND" or a "RECEIVE" action along with the "SHORT_CIRCUIT" action.

With the polymorphic-mesh mechanism, twelve patterns formed by the polymorphic-mesh are described in the following. Their corresponding control algorithms are described in order.

CONTROL ALGORITHMS

(P1) Linear Array

As shown in FIG. 4, a row linear array of length M×M and a column linear array of the same length can be formed from an M×M polymorphic mesh by connecting S of PE (M−1, i) to N of PE (0, i+1) and connecting E of PE (i, M−1) to W of PE (I+1, 0). the N of PE (0,0) and S of PE (M−1, M−1) are the beginning and the end of the column linear array respectively while the W of PE (0, 0) and E of PE (M−1,M−1) are the beginning and the end of the row linear array.

The control algorithm is as follows. At per PE cycle,

```
LINEAR ()
{
    MEM = W;  /* action 1*/
    E = MEM;  /* action 2*/
    MEM = N;  /* action 3*/
    S = MEM;  /* action 4*/
}
```

Action (1) takes the datum on W into MEM at the end of the cycle while action (2) puts the content of MEM (at the beginning of the cycle on E. In combination, actions (1) and (2) create the row array. The data injected through W of PE (0,0) will march eastbound and after M cycles, the first row will be filed. After another M cycles, the data in the first row will march to the second row while the new data will fill the first row. Actions (3) and (4) create a column linear array in a similar fashion.

The formulation of the linear ray is unconditional. All PEs are taking the same action. The mechanism in the connection control mechanism is not utilized.

(P2) Row Tree

M trees (one per row) can be formed from the polymorphic mesh by the following control algorithm.

```
ROW-TREE ()
{
int t; /* t is time step*/
int pid0; /* column position of a PE, Process ID0*/
int M, logM; /*M is the side size of the mesh and logM = log M*/
int treemask = 1;/* a flag to contruct the tree*/
for (t =0; t<logM; t++){
    if( treemask)
        {SHORT_WE; DISABLE;}
    if(treemask &&  pid0<t>)
        E = MEM;
    if(treemask && pid0<t>)
        MEM = W;
    treemask = treemask & pid0<t>;
```

-continued
```
    }
}
```

FIG. 5 illustrates the above control algorithm for a 8-PE case. At t+0, the "treemasks" for all PEs are 1, therefore, every PE is enabled and the "even PE's" send data to "odd PE's". This is indicated by an arrow between every pair of "odd/even" PE's. This also forms the bottom level of the tree.

At t=1, by investigating treemask, only the PEs with pid0<0> = 1(lowest bit of pid0) are enabled. The disabled PEs are not shown by circle but they do establish the connection between PE 1 and 3, and PE 5 and 7 by the action SHORT_WE. This forms the second level of the tree.

The highest level of the tree is formed by the control at t=2. At this step, only PE 3 and PE 7 are enabled; the rest PEs established the connection by "SHORT" the W-E path but do not perform any operation (or equivalently do not change any state of MEM).

An alternative view of this control algorithm is shown in FIG. 6 with the nodes at each level of the tree marked by the processor identification (pid) of the PEs.

The tree pattern is extremely useful in the paradigm of divide-and-conquer. Dedicated tree-machines have been built for special-purpose computing. The complexity of the algorithms in this paradigm is usually O(log N) where N is the size of the input data. The same algorithms usually need O(N) execution time in a mesh; this represents a 1024:10 speedup for N=1024. Important algorithms in this category include MAX, MIN, k-th largest, median, some/none etc.

Using the mechanism in the connection control block, the control algorithm uses register X for pid0, register SRX and flag F1 for "treemask". The content of X register is copied to the SRX so that pid<t> bit is shifted out at time step t in BSRX then ANDed with "treemask" to derive the final condition.

(P3) Column Tree

Similar to Row Tree, M column trees can be formed by the polymorphic mesh with the row position of the PEs, pid1, as the control and N-S path as the connection. The control algorithm is as follows.

```
COLUMN-TREE ()
{
int t; /* t is time step*/
int pid1; /* row position of a PE*/
int M, logM; /*M is the side size of the mesh and logM = log M*/
int treemask = 1;/* a flag to construct the tree*/
    for (t=0; t<logM; t++){
        if( treemask)
            {SHORT_NS; DISABLE;}
        if(treemask && pid1<t>)
            S = MEM;
        if(treemask && pid0<t>)
            MEM = N;
        treemask = treemask & pid0<t>;
    }
}
```

Column Trees are useful in transporting the data distributed column-wise in the mesh and converting algorithms with linear complexity (O(N)) to logarithmic complexity (O(log N)) as discussed in Row Tree section.

Similar to ROW_TREE, the COLUMN_TREE control algorithm uses register Y for pid1, SRY to copy Y, and F2 to hold "treemask". The condition to SHORT_NS is based on the ANDing of F2 and BSRY which produces pid1<t> at time step t.

(P4) Orthogonal Tree

Orthogonal Tree (FIG. 9) is a useful network for sorting, matrix operations, minimum spanning tree, FFT and other graph algorithms. It can be formed from the polymorphic mesh by combining the Row Trees and the Column Trees by the ORTH_TREE control algorithm below.

```
ORTH_TREE ()
{
int t; /* t is time step*/
int pid0; /* column position of a PE, Process ID0*/
int pid1; /* row position of a PE*/
int M, logM; /*M is the side size of the mesh and logM = log M*/
int hmask=1, vmask=1;/* flags to construct the tree*/
    for (t=0; t<logM; t++){
        /*cycle 1*/
        if( hmask)
            {SHORT_WE; DISABLE;}
        if(hmask && pid0<t>)
            E = MEM;
        if(hmask && pid0<t>)
            MEM = W;
        hmask = hmask & pid0<t>;
    /*cycle 2*/
        if( vmask)
            {SHORT_NS; DISABLE;}
        if(vmask && pid1<t>)
            S = MEM;
        if(vmask && pid1<t>)
            MEM = N;
        vmask = vmask & pid1<t>;
    }
}
```

Key advantages of forming the Orthogonal Tree from the polymorphic mesh are (1) reduction of chip area: the chip area required to layout the mesh and the orthogonal tree are $O(N^{}2)$ and $O((N^{}2) * (\log N)^{}2)$ respectively where N is the side size of the mesh and the number of leafs of the orthogonal tree. This represent a saving at a factor of $(\log N)^{}2$. For N=1024, the chip area used by the polymorphic mesh is 1/100 of the orthogonal tree. (2) efficient neighborhood operations: PEs in Orthogonal Tree does not connected to its geographical nearest neighbors hence for image processing, many important neighborhood operations can not be performed efficiently because there are no direct communication paths. In fact, more than half of the data in a 3×3 window must be passed up one level in the tree passed down to the center of the window; the average distance among data in a 3×3 window is 2.125 as against 1.5 in the polymorphic mesh. A sample 3×3 window for the orthogonal tree is shown in FIGS. 8 and 10 and the number in the circle is the distance between that datum and the center of the window.

Figure 10:
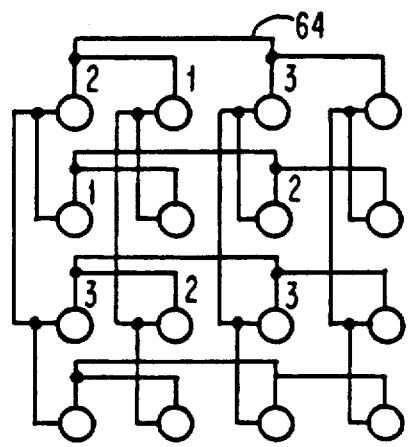

As summarized in FIG. 7 for N=4, between the polymorphic mesh and the orthogonal tree, the ratio of chip area is 16:46 and that of average distance in a 3×3 window is 1.5:2.1 (FIGS. 8 and 10).

The control algorithm ORTH_TREE uses register X for pid0, SRX to copy pid0, F1 for hmask, and produces pid1 <t> at time step tin BSRX. Symmetrically, the control algorithm uses register Y for pid1, SRY to copy pid1, F2 for vmask, and produces pid1<t> at time step t in BSRY. The conditional SHORT_WE and SHORT_NS are based on BSRX, F1 and F2.

(P5) Reverse-Row Tree

RR-Tree is a top-down tree (as against row trees which are bottom-up) which can be formed from the top level to the bottom level of the tree, a reverse process of the row tree. The control algorithm is shown below.

```
RR-TREE ()
{
int t; /* t is time step*/
int pid0; /* column position of a PE*/
int M, logM; /*M is the side size of the mesh and logM = log M*/
int treemask = M%2;/* a flag to construct the tree*/
int mask; /*an intermediate condition*/
    for (t=0; t<logM; t++){
        mask = ANDALLBIT ( treemask | pid0 );
        if( mask)
            {SHORT_WE; DISABLE;}
        if(mask && pid0<logM-t-1>)
            W = MEM;
        if(mask &&  pid0<logM-t-1>)
            MEM = E;
        treemask = ASHIFT ( treemask,1);
    }
}
```

As shown in FIG. 11 by a 8-PE example, the control algorithm can be described as follows. The flag treemask was initialized as one half of the total number of PEs (i.e. 4=100). The INVERTed "treemask" is first "ORed" with pid0 then the result is passed to ANDALLBIT which returns a '1' in 'mask' if all bits of the result are '1' and returns a '0' otherwise. The PEs with mask=1 (i.e. PE 3 and 7) are part of the tree and the rest, being not a tree node, will disable themselves and SHORT their W-E path to establish the tree connection. For PE 3 and 7, bit 2 of pid0 is further checked, a '1' in this bit lets PE 7 send datum to the receiver PE 3 whose bit 2 is '0'. This forms the top level of the tree at t=0.

At the end of 5=0, treemask is shifted arithmetically one bit to the right. It therefore becomes 110 for the next time step.

At t=1, the same process identifies that PE 1, 3, 5 and 7 are the tree nodes, and PE 7 sends data to PE 5 and PE 3 to PE 1. Treemask becomes 111 at the end of t=1.

At t=2, every PE is a tree node and each PE with odd pid0 sends data to its neighbor with lower even pid0.

Using the mechanism is connection control block, "treemask" is loaded to SRM, and X copied to SRX. Register X is "ORed" with the INVERTed SRM first; the result is then "ANDALLBITed" to produce "mask". SRX is shift left logically to produce pid-0<logM-t-1> in BSRX at time step t. This is used to control the SEND/RECEIVE action for a pair of the tree nodes.

The RR-Tree is mainly for propagating a datum to all tree nodes which will perform different operations to this datum depending on their positions in the tree. For computer graphics, this pattern is useful because it allows each PE to generate A*X simultaneously where A is a constant and X is pid0. Evaluating A*X in parallel allows the fast generation of a line; this will be further discussed in another pattern called Diagonal-Span-Tree (P12).

In general, a reverse tree is used to convert a symbolic representation in a parameter space to an iconic representation in image space, then the algorithm is performed iconically in a massive parallelism available in the polymorphic mesh.

Although the control algorithm uses the PE with the highest pid0 as the root of the tree, the PE with the lowest pid0 can be used as the root as well and the control algorithm is of equivalent complexity.

(P6) Reverse Column Trees (RC-Tree)

Similar to RR-Tree, the RC-tree can be formed by using pid1 as the control and N-S as the path to establish the tree connection. This is shown in the following control algorithm.

```
RC-TREE ()
{
int t; /* t is time step*/
int pid1; /* row position of a PE*/
int M, logM; /*M is the side size of the mesh and logM = log M*/
int treemask = M%2;/* a flag to construct the tree*/
int mask; /*an intemedate condition*/
    for (t=0; t<logM; t++){
        mask = ANDALLBIT ( treemask | pid1 );
        if( mask)
            {SHORT_NS; DISABLE;}
        if(mask && pid1<logM-t-1>)
            N = MEM;
        if(mask &&  pid1<logM-t-1>)
            MEM = S;
        treemask = ASHIFT ( treemask, 1);
    }
}
```

The properties of the RC-Trees are the same RR-Trees except that RC-Trees are related to the data in the column of the mesh.

(P7) Row-Bus

For broadcasting purpose, a bus is a very useful pattern whose broadcasting distance is the shortest. One bus can be formed for every row of the polymorphic mesh by the following control algorithm.

```
ROW_BUS ()
{
int sender; /* ID for the sender*/
int pid0;
    SHORT_WE;
    if (pid0 == sender)
        E = MEM;
    else
        MEM = W;
}
```

A PE in a row is designated as the "sender" and the rest of the PEs are the receivers. All PEs "SHORT" their E-W path to establish the bus, and the sender will send the data to E (or W) while the receivers can receive the data from W (or E). (In another case when a datum is injected into W or E by the external controller, there is no "sender" PE and all PEs are the "receivers".)

Using the mechanism provided by the connection control block, "sender" is loaded to SRM. The "INVERTed" SRM is "XORed" with register X which stores pid0; the resulting bits are "ANDALLBITed". A '1' in XANDALL identifies the PE as a sender and those PEs with XANDALL=0 are the receivers.

(P8) Column Bus

Similar to Row Bus, a Column Bus can be formed for each column of the polymorphic mesh by using pid1 as the control and N-S as the path as shown in the following control algorithm.

```
COLUMN_BUS ()
{
int sender; /* ID for the sender*/
int pid1;
    SHORT_NS;
    if (pid1 == sender)
        S = MEM;
    else
        MEM = N;
}
```

The property of the column bus is the same as the row bus.

In combination, the row bus and the column bus can be used to broadcast a common datum to all PEs in the mesh in two steps. At the first step, the common datum can be broadcasted to all PEs in the top row; then at the second step, the PE at the top row can broadcast the common datum to all other PEs along column direction.

(P9) Pyramid

Pyramid configuration is powerful in image processing and computer vision mainly because of its capability in handling multi-resolution images. This pattern can be formed from the mesh by the following control algorithm:

```
PYRAMID ()
{
int t; /* t is time step*/
int pid0; /* column position of a PE*/
int pid1; /* row position*/
int M, logM; /*M is the side size of the mesh and logM=log M*/
int hmask=1, vmask=1; /*two flags to construct the pyramid*/
for (t=0; t<logM; t++){
/*cycle 1 action*/
    if( hmask | vmask)
        {SHORT_WE; SHORT_NS; DISABLE;}
    if(hmask && vmask &&  pid0<t> &&  pid1<t>)
        E = MEM;
    if(hmask && vmask && pid0<t> &&  pid1<t>)
        {N = MEM; MEM1 = W;}
    if(hmask && vmask &&  pid0<t> &&  pid1<t>)
        E = MEM;
    if(hmask && vmask && pid0<t> && pid1<t>)
        {MEM0 = N; MEM2 = W;}
/*cycle 2 action*/
    if( hmask | vmask)
        {SHORT_WE; SHORT_NS; DISABLE;}
    if(hmask && vmask &&  pid0<t> &&  pid1<t>)
        NO_ACTION;
    if(hmask && vmask && pid0<t> &&  pid1<t>)
        S = MEM1;
    if(hmask && vmask &&  pid0<t> &&  pid1<t>)
        NO_ACTION;
    if(hmask && vmask && pid0<t> && pid1<t>)
        MEM1 = N;
    hmask = hmask & pid0<t>;
    vmask = vmask & pid1<t>;
}
}
```

The control algorithm consists of log M steps and within each step there are two control cycles. In another word, each step forms a level of the pyramid in two PE cycles.

Figure 12:
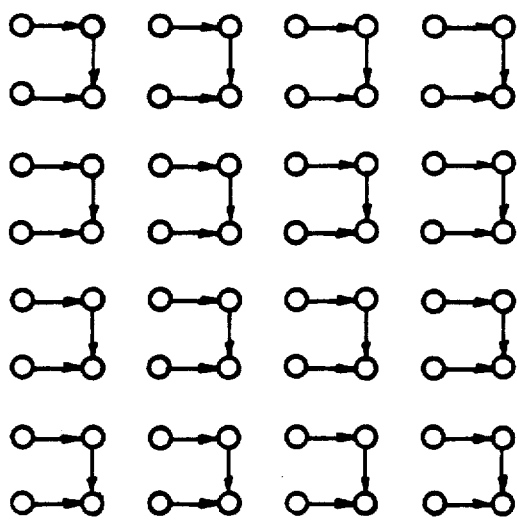
Figure 14:
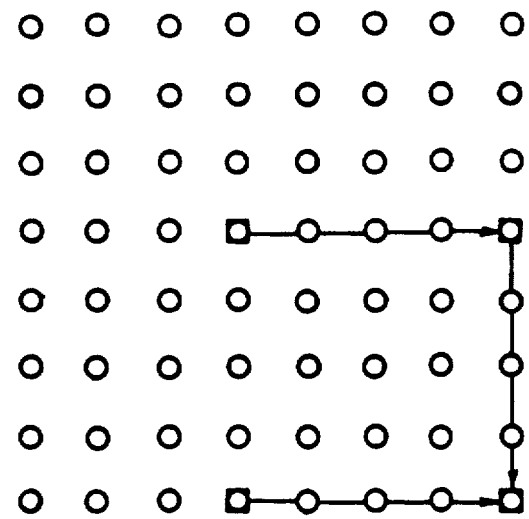
Figure 13:
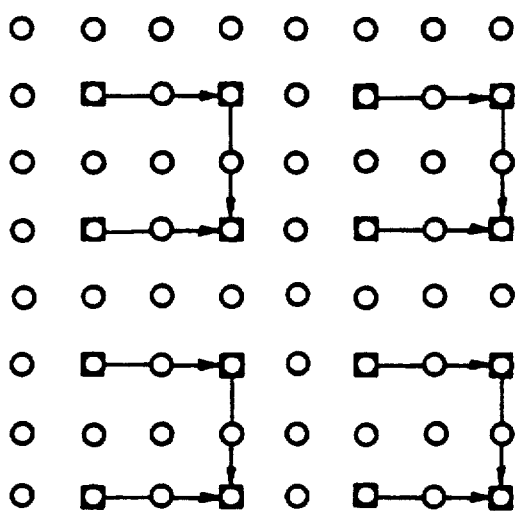

FIGS. 12, 13 and 14 depict the pyramid control algorithm by a sample 8×8 mesh. Two masks, hmask (for row) and vmask (for column), are initialized as '1' such that all PEs in the mesh are 'enabled' at the first time step. At t=1, all PEs are active and every 2×2 PEs are formed as a group. These four (2×2) PEs are the NW, NE, SW and SE sons of the pyramid and the parent is the same as the SE son. The activity of the four sons are distinguished by the pid0<t> and pid1<t> bits. The SE son (or the parent) being designated as pid0<0> = pid1<0> = 1, will receive data from the SW (pid0<0> =0 and pid1<0> =1) and NE (pid0<0> =1 and pid1<0> =0) sons at the first cycle. In this cycle, the NW son enroutes its data to the NE son; this data will be received by the parent at the second cycle. At the second cycle, only the NE son and the parent are involved in sending and receiving; the other two PEs have no action. Both vmask and hmask are updated to control the connection of next time step.

At t=1, again four PEs form the four sons and one parent of the next level pyramid. But these four PEs span in a 4×4 mesh as shown in FIG. 13. The activity of four sons and the parent is the same as t=0 except that PEs at even rows or even columns are disabled. These disabled "non-pyramid" PEs SHORT their W to E line, and N to S line to establish the pyramid connection.

PEs that constitute the last-level pyramid are shown in FIG. 14. Their activities are the same as the previous two steps.

Figure 15:
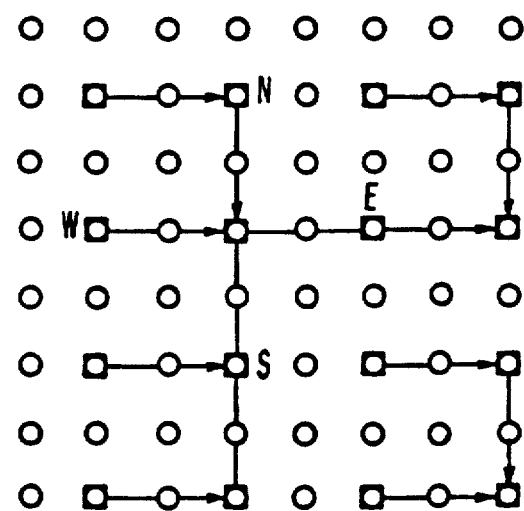

Orthogonal to the pyramidal structure described above, the pyramid pattern has a mesh connection at each level. That is for each node in the pyramid there exist four neighbors (N,S,E,W) at the same level other than four sons at the level below and one parent at the level above. This relation is shown in FIG. 15.

The control algorithm for obtaining the neighbors at the same level has been imbedded in the above pyramid control algorithm. For example, at t=0 as shown in FIG. 8a, the neighbors at the same level are connected by the original mesh. At t=1, the neighbors at the same level are scattered in every other row and column and the mesh connection for them has been established by the above-mentioned control algorithm PYRAMID.

To obtain the content of its neighbors at the same level of the pyramid, two control cycles are added to every step of the control algorithm PYRAMID as follows. Cycle 3 is to obtain content of N and W while cycle 4 is to obtain that of S and E.

```
PYRAMID ()
{
int t; /* t is time step*/
int pid0; /* column position of a PE*/
int pid1; /* row position*/
int M, logM; /*M is the side size of the mesh and logM=log M*/
int hmask=1, vmash=1; /*two flags to construct the pyramid*/
for (t=0; t<logM; t++){
/*cycle 1 action*/
    if( hmask | vmask)
        {SHORT_WE; SHORT_NS; DISABLE;}
    if(hmask && vmask &&  pid0<t> &&  pid1<t>)
        E = MEM;
    if(hmask && vmask && pid0<t> &&  pid1<t>)
        {N = MEM; MEM1 = W;}
    if(hmask && vmask &&  pid0<t> && pid1<t>)
        E = MEM;
    if(hmask && vmask && pid0<t> && pid1<t>)
        {MEM0 = N; MEM2 = W;}
/*cycle 2 action*/
    if( hmask | vmask)
        {SHORT_WE; SHORT_NS; DISABLE;}
    if(hmask && vmask &&  pid0<t> &&  pid1<t>)
        NO_ACTION;
    if(hmask && vmask && pid0<t> &&  pid1<t>)
        S = MEM1;
```

```
        if(hmask && vmask &&   pid0<t> && pid1<t>)
            NO_ACTION;
        if(hmask && vmask && pid0<t> && pid1<t>)
            MEM1 = N;
/*cycle 3 action*/
        if( hmask | vmask)
            {SHORT_WE; SHORT_NS; DISABLE;}
        if(hmask && vmask){
            S = MEM3;
            E = MEM4;
            MEM3 = N;
            MEM4 = W;
        }
/*cycle 4 action*/
        if( hmask | vmask)
            {SHORT_WE; SHORT_NS; DISABLE;}
        if(hmask && vmask){
            N = MEM5;
            W = MEM6;
            MEM5 = S;
            MEM6 = E;
        }
        hmask = hmask & pid0<t>;
        vmask = vmask & pid1<t>;
    }
}
```

Using the mechanism in the connection control block, hmask and vmask are loaded to F1 and F2 respectively. The pid0 in register X and pid1 in register Y are copied to SRX and SRY respectively. Shifting logically to the right, BSRX and BSRY will contain pid0<t> and pid1<t> at time step t. These condition bits along with F1 and F2 are used to implement the SHORT actions.

The above-described pyramid has a base of M×M and a shrinkage of 2, meaning that the level above the base has M/2×M/2 PEs and so on. The PYRAMID control algorithm can be extended to handle any shrinkage K, where K is a power of 2, by updating hmask and vmask by $$hmask = hmask \ \& \ pid0<t> \ \& \ pid0<t+1>$$

$$vmask = vmask \ \& \ pid1<t> \ \& \ pid1<t+1>$$

and by skipping the pyramid node actions on every off t step.

(P10) Reverse Pyramid

Information flows from bottom to top level in a pyramid for iconic to symbolic conversion. However, there is need for the information to flow in the opposite direction for symbolic to iconic conversion. This can be served by the Reverse Pyramid (R-Pyramid) formed from the polymorphic mesh by the following control algorithm.

```
R-PYRAMID ()
{
    int t; /* t is time step*/
    int pid0; /* row position of a PE*/
    int pid1; /* column position of a PE*/
    int M, logM; /*M is the side size of the mesh and logM = log M*/
    int mask = M%2;/* a flag to construct the pyramid*/
    int hmask, vmask;
    for (t=0; t<logM; t++){
        hmask = ANDALLBIT ( mask | pid0 );
        vmask = ANDALLBIT ( mask | pid1 );
/*cycle 1*/
        if( hmask | vmask)
            {SHORT_;SHORT_NS; DISABLE;}
        if(hmask && vmask && pid0<logM-t-1> && pid1<logM-t-1>)
            N = MEM2;
        if(hmask && vmask && pid0<logM-t-1> && pid1<logM-t-1>)
            MEM2 = S;
        if(hmask && vmask &&  pid0<logM-t-1> && pid1<logM-t-1>)
            NO_ACTION;
        if(hmask && vmask &&  pid0<logM-t-1> && pid1<logM-t-1>)
            NO-ACTION;
/*cycle 2*/
        if( hmask | vmask)
            {SHORT_WE; SHORT_NS; DISABLE;}
        if(hmask && vmask && pid0<logM-t-1> && pid1<logM-t-1>)
            {N = MEM1; W = MEM3;}
        if(hmask && vmask && pid0<logM-t-1> && pid1<logM-t-1>)
            {MEM1 = S; W = MEM2;}
        if(hmask && vmask &&  pid0<logM-t-1> && pid1<logM-t-1>)
            MEM3 = E;
        if(hmask && vmask &&  pid0<logM-t-1> && pid1<logM-t-1>)
            MEM2 = E;
        mask = ASHIFT ( mask, 1);
    }
}
```

The control algorithm for the R_PYRAMID is a reverse process of the PYRAMID control algorithm and is an expansion of the RR_TREE and RC_TREE.

One half of the mesh size (the "mask") is loaded to register SRM, while pid0 in X and pid1 in Y are copied to SRX and SRY respectively. The "INVERTed" SRM is "ORed" with X then "ANDALLBITed" to produce a flag "hmask" in XANDALL. Similarly, "vmask" is produced in YANDALL. Along with these two condition bits, pid0 and pid1 are shifted logically from left to right to produce pid0<log M−t−1> and pid1<log M−r−1> at time step t in BSRX and BSRY respectively. FIGS. 16, 17 and 18 illustrate the forming of a pyramid in an 8×8 polymorphic pyramid.

In a similar way as PYRAMID, each step of the R-PYRAMID control algorithm consists of two cycles: the first cycle is an intermediate stage of sending data to the NW son (data are routed to the NE son in this cycle and to NW son at the second cycle); and at the second cycle while the NE son is routing the data to the NW son, the parent sends data to the NE and SW sons at the same time.

Connection for the neighbors at the same level of the pyramid can also be established by the R-PYRAMID control algorithm similar to PYRAMID. However, communication at the same level is not used in general for information flowing top-down. When it is necessary, actions similar to cycle 3 and 4 of the PYRAMID control algorithm can be used.

The above-described pyramid has a base of M×M and a shrinkage of 2, meaning that the level above the base has M/2×M/2 PEs and so on. The R-PYRAMID control algorithm can be extended to handle any shrinkage K, where K is a power of 2, by initializing SRM by M/(log K) and shifting SRM log K bits per step.

(P11) Cube

Cube is the most natural extension of the polymorphic mesh into a 3D structure. The usefulness of cube to 3D data structure (e.g. 3D image element=volume=voxel) can be analogously described as the usefulness of the mesh to 2D data structure (e.g. 2D picture element=area=pixel).

To form the cube from the mesh, the data structure in the third dimension is sliced vertically and allocated to one PE such that the communication in the third dimension can be accomplished by the local memory communication while the communication involving the other two dimensions are served by the mesh. In fact, the polymorphic feature is not used in forming this pattern and the cube formation may not be as novel as the other eleven patterns. Nevertheless, the cube pattern is supported by the polymorphic mesh with the saving of the connection pins in the third dimension. Since the saving is significant (2M×M×M pins in total), the forming of the cube from the polymorphic mesh is important to its VLSI implementation.

With the data slicing, an M×M×K cube can be formed, where K is an integer and the value of K is only limited by the amount of local memory in the PE.

(P12) Diagonal-Span Tree (DST)

A Diagonal-Span-Tree (DST) is a binary tree whose leafs span the diagonal of the mesh once and only once. By this definition, the DST in an N×N mesh has N leafs each of which occupies a diagonal node designated as PE(k, N−1−k), k=0 to N−1. There are many possible DSTs in a mesh. We choose the one shown in FIG. 19 (exemplified by a 3-level DST in an 8×8 mesh) because it is simple to control.

Figure 19:
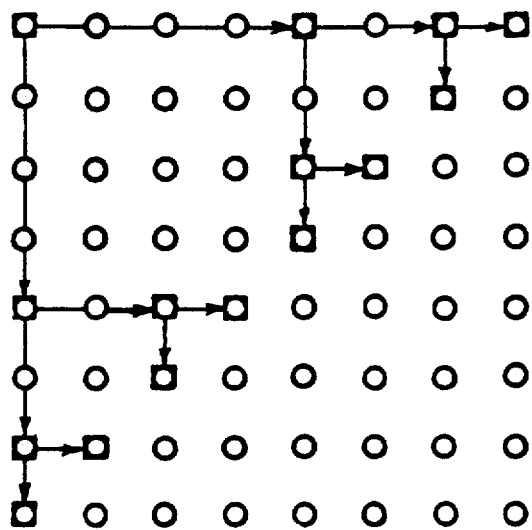

As shown in FIG. 19, the root of the DST is at PE(0, 0) (upper left corner of the mesh). The left son of the root is four units away vertically (i.e. PE(4, 0)) while its right son is four units away horizontally (i.e. PE(0, 4)). The second level sons are two units away from the corresponding first level sons vertically and horizontally. Thus PE(0, 6) and PE(2, 4) are the sons of PE(0, 4), and PE(4, 2) and PE(6, 0) are the sons of PE(4, 0). Spanning in a similar way, all diagonal PEs of the mesh are the third level sons.

In a general definition, a UpperLeft DST (ULDST) in a N×N mesh has PE(0, 0) as the root and the diagonal PEs (k, N−1−k), k=0 to N−1, as the leafs. The i-th level (i=1 to log N) left son of PE(s, t) is PE(s+2(log N−i), t) and the i-th level right son of PE(s, t) is PE(s, t+2(log N−i)).

The control algorithm for ULDST is listed below.

```
ULDST ()
{
int fs=0, fr=0; /*flag-send is used to construct the DST*/
               /*flag-receive is an intermediate var to update fs*/
int pid0, pid1;
int t; /* t is time step*/
int M, logM; /*M is the side size of the mesh and logM=log M*/
int treemask=M%2;/* a flag to construct the tree*/
    if(pid0==0 && pid1==0) {
        fs = 1; fr = 1;}
    for (t=0; t<logM; t++){
        hmask = ANDALLBIT (  treemask | pid0 );
        vmask = ANDALLBIT (  treemask | pid1 );
        if( hmask |   vmask)
            {SHORT_WE; SHORT_NS; DISABLE;}
        if(hmask | vmask && fr)
            {E = fs; S = fs; fr = 0;}
        if(hmask | vmask &&   fr)
            {fs = W | N; fr = W | N; }
        treemask = ASHIFT ( treemask, 1);
    }
}
```

Using an 8×8 polymorphic mesh as an example, the ULDST algorithm can be explained as follows. A root PE(000, 000) is selected for the DST and its fs and fr are set to 1. At t=0 time step, rows 000 and 100, and columns 000 and 100 are active while the rest are disabled. The disabled PEs short their WE and NS to establish a temporary path for updating fs. The active PE with fr=1 sends its fs value to E and S neighbors, then reset fr to 0 so that it will not be a sender at the next time step. The receivers (with fr=0) updates its fs as the ORed value of N and W. The receivers also update its fr with the same ORed result therefore the PE just received a 1 from N or W will be the sender at the next time step. Step t=0 selects two PEs (PE(000, 100) and (100, 000)) as nodes of DST (via setting their fs=1) furthermore this step prepares them as the new senders (via setting fr=1) to set more DST nodes in the following step.

At the next step, each of the two new senders will produce two DST nodes and two senders in a similar way. The new nodes and senders are PEs (000, 110), (010, 100), (100, 010) and (110, 000).

At t=2, the diagonal PEs are reached by the control algorithm; their fs will be set to 1 to identify themselves as part of the DST. Furthermore, their fr will be set to 1, which is additional information to identify themselves as diagonal nodes. The diagonal identification is a bonus from the DST algorithm. It is useful for many types of computing to be discussed in the next section.

To form an DST, the flag fs is used as the condition: PEs with fs=0 short WE and NS paths while PEs with fs=1 send MEM to E and S, and receive data from W and N.

Using the mechanism in the connection control block, "treemask" is loaded to SRM, fs to F1 and fr to F2. The IINVERTed SRM is ORed with pid0 in register X and pid1 in register Y respectively; the "ORed" results are "ANDALLBITed" to produce "hmask" in XANDALL and "vmask" in YANDALL. At the end of each step, SRM is shifted arithmetically one bit to the right. The SHORT action is then based on F2, XANDALL and YANDALL.

Figure 20:
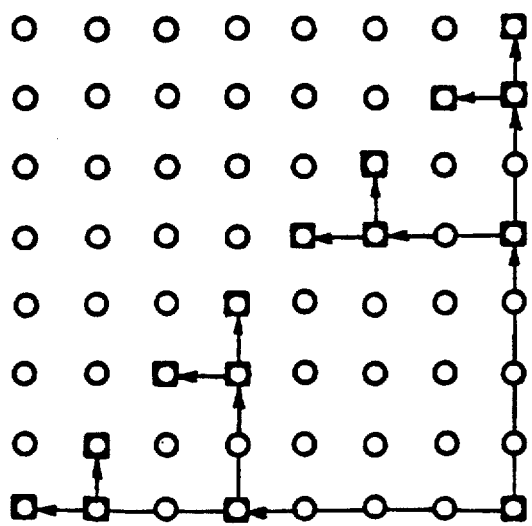

By choosing a different root and using a similar control algorithm, different DST can be form in the same polymorphic mesh. FIG. 20 shows a DST with the root in the lower right corner; it is called URDST.

In the following we show that the coexistence of ULDST and LRDST allows us to compute A*X+B*Y+C in parallel for each pixel (x, y) in an image. This capability has a very wide applications in computer graphics and computer vision.

APPLICATIONS

Besides the well-known application of a plain mesh to image processing the following applications of polymorphic mesh are either faster in polymorphic mesh or not-implemented in the plain mesh. These applications are categorized into six types.

(1) Divide-and-conquer computing

This type of computing involves in dividing a set of N data into two groups at first according to their property. Then by applying the same property, each group is further divided into two subgroups. This process is repeated until each group contains only one datum.

For mesh connection, this type of computing has the complexity of O(N) or higher. By transforming to trees and pyramids, the complexity of this type of computing is O(log N) in the polymorphic mesh. The speedup for a data set of N=1024 is 100:1, a two orders of magnitude improvement.

Computations belonging to this type include sorting, find maximum, minimum, k-th largest and median. All these algorithms are of complexity O(log N).

(2) Iconic-to-symbolic Conversion

This type of computing is specific to computer vision and is often called intermediate level processing. Given an image, we are interested to know (a) how many pixels satisfy a specified property;
(b) which pixels satisfy the specified property;
(c) are SOME or NON or ALL pixels satisfy the specified property;

The property for the above can be
(a) equal to a value;
(b) greater than a value
(c) smaller than a value
(d) condition synthesized arithmetically and logically from above All these algorithms can be computed in O(log N) steps in polymorphic mesh by tree and pyramid patterns. More importantly and in significant contrast to the conventional fixed-pattern approach, only the answer (as against the whole intermediate image) is output. This significantly reduces the I/O rate; in the extreme case, only one bit (YES/NO) as against 1024×1024 bits (the whole image) is output.

Related to I/O, extra N-S path has been traditionally added to the mesh to support concurrent I/O and processing. This mechanism and benefit are also valid for the polymorphic mesh, however, is irrelevant to the invention.

(3) Statistic Measurement

The polymorphic mesh is capable of computing the following statistics in O(log N) steps. The statistics include
(a) mean, variance, standard deviation;
(b) area, perimeter and centroid
(c) first moment, second moment and cross moment
Item (a) is general to a set of N data while item (b) and (c) are specific to an image.

The statistics are foundations of other algorithms. In computer vision, they are the basis for region analysis and pattern recognition.

(4) Compute A*x+B*y+C

To compute A*x+B*y+C, four patterns need to be formed by the polymorphic mesh: they are one Upper-Left-Diagonal-Span-Tree (ULDST), one Lower-Right-DST (LRDST), Row-Buses and Column-Buses. The ULDST and LRDST must coexist to compute A*X+C and B*Y simultaneously while the Row-Buses and the Column-Buses are coexistent to do the summing (e.g. A*X+C+B*Y).

The algorithm is performed in a bit-serial manner. The extra two trees in the pixel-plane can be eliminated. Constant arguments A and B are broadcast to all PEs before the computing begins and are stored in array A and B with (log M − 1) "0"s preempted at the beginning of the arrays. The storage of A and B is bit-reversed so that after the preempted "0"s are accessed, the least significant bit of A and B will be accessed first. The constant argument C is injected into the polymorphic mesh through W of the root of the ULDST one bit per time step starting from the least significant bit. Using the ULDST as the tree to compute A*X+C, each PE has three variables (sum, carry and delay). At each time step, "sum" is passed Eastbound and "delay" is passed Southbound while each PE performs two operations (a) add N with array A, store the carry bit in "carry" and (b) store N in "delay". After log M steps, the diagonal PEs of the mesh (or the leafs of ULDST) stores A*X for the corresponding row. Similarly, the computing of B*Y can be done by LRDST with "0" injected from E of the root and with each PE passes "delay" Northbound and "sum" Westbound. After log M steps, the diagonal elements store B*Y for each corresponding column.

After obtaining A*X+C in rows and B*Y in columns, the polymorphic mesh changes to Row-buses in WE path and Column-buses in NS path. Each PE then adds the value on Row-bus to value on Column-bus to produce A*X+B*Y+C in bit serial fashion.

Since there is a conflict of resource in establishing the DSTs and the buses simultaneously, the result of A*X+B*Y+C is delivered in bit serial at every other time step.

(5) Fast Line Detection

With the capability of computing A*X+B*Y+C in every two time steps of the polymorphic mesh, we can have ever pixel (X, Y) in an M×M image to decide whether it is on a given line determined by A, B and C. Assume that all numbers are K bits long, the decision can be made in logM+2K time steps.

The capability of fast line detection is very useful in computer graphics and computer vision. For computer graphics, it is useful in displaying convex polygons, in creating shadow, in clipping, in drawing spheres, in computing adaptive histogram equalization, in texture mapping and anti-aliasing. For computer vision, such a capability is useful in computing Fast Hough Transform for detecting lines in a noisy image.

(6) Converting Symbolic Information to Iconic Information

With the massive parallel hardware available in the polymophric mesh, it is advantageous to convert a symbolic processing (usually not done in mesh) into iconic processing so that the processing can be done in a massively parallel way. The Fast Hough Transform mentioned above is one such example. The "mask generating" to be described is another class applications in this category.

(6.1) Band Mask Generation

A "band mask" is confined within two parallel lines, one of which is determined by (A, B, C1) and the other by (A, B, C2). To generate a "band mask", each PE computes $A*X+B*Y+C1$ and $A*X+B*Y+C1+(C2-C1)$ as described above. The computing produces S1 (the sign of $A*X+B*Y+C1$) and S2 (the sign of $A*X+B*Y+C2$), both of which are used in deciding whether pixel (X, Y) is inside the band.

The "band mask" provides a capability to a computer vision system in processing only the region of interest. The human vision adopts a different strategy in generating masks. The "strategy" is a symbolic information but its processing is actually done iconically as described.

(6.2) Polygonal Mask Generation

The "polygonal mask" is a generalization of the band mask. It consists of the union of P half planes, each of which is determined by a line specified by $X*X+B*Y+C$. Using the line detection capability, we can obtain signs S1, S2 to SP for the corresponding lines. The Boolean combination of S1 to Sp determines a pixel (X, Y) is inside the polygon.

CONCLUSIONS

The preferred embodiment of the invention carries out the following transforms under control of the connection control mechanism:

The physical $M \times M$ mesh connection to one row and one column linear arrays, each $M \times M$ long.

The physical $M \times M$ mesh connection to M row trees, each of which has M leaves.

The physical $M \times M$ mesh connection to M column trees, each of which has M leaves.

The physical $M \times M$ mesh connection to a $M \times M$ orthogonal tree.

The physical $M \times M$ mesh connection to M reverse row trees, each of which has M leaves.

The physical $M \times M$ mesh connection to M reverse column trees, each of which has M leaves.

The physical $M \times M$ mesh connection to M row buses, each of which has M PEs.

The physical $M \times M$ mesh connection to M column buses, each of which has M PEs.

The phyiscal $M \times M$ mesh connection to a pyramid with $M \times M$ base and a shrinkage K where K is the power of 2.

The physical $M \times M$ mesh connection to a reverse pyramid with $M \times M$ base and a shrinkage K where K is the power of 2.

The physical $M \times M$ mesh connection to a $M \times M \times K$ cubs, where K is an integer and is only limited by the local memory of PE.

The invention carries out the following transforms under control of programming outside the connection control mechanism:

The physical $M \times M$ mesh connection to a DST tree (whose root can be at any corner of the mesh). Up to two DSTs can coexist if their roots are at the opposite corners of a diagonal.

The physical $M \times M$ mesh connection to a $M \times M$ orthogonal tree in $O(M2)$ silicon area. A saving at a factor of $O((\log M)2)$ is obtained by the invention, where M is the side size of the orthogonal tree.

The class of divide-and-conquer algorithms of linear, O(M), complexity into logarithm, O(log M), complexity. A saving of M/logM is obtained by the invention. Such class of algorithms is discussed in the description of the preferred embodiment.

The iconic-to-symbolic conversion (intermediate level processing) occurs within the polymorphic mesh such that the I/O is significantly reduced. In an extreme case as discussed in the description of the preferred embodiment of the invention, a reduction of six orders of magnitude is obtained.

Symbolic representation can be transformed into iconic representation by the above patterns such that the processing can be performed iconically in massive parallelism available in mesh. Such a feature expands the capability of mesh into the domain of symbolic processing, The mesh system is capable of:

(a) performing iconic processing, (b) converting iconic information to symbolic information, (c) converting symbolic information to iconic information and (d) performing symbolic processing in its iconic equivalence.

The invention allows the computing of $A*x \times B*y+C$ in an $M \times M$ mesh in O(log M) steps for every pixel (x,y) in parallel where A,B and C are constant integers.

The invention allows the detection for every pixel (x,y) in an $M \times M$ image whether the pixel (x,y) is (a) on the line (b) to the right of a line or (c) to the left of a line in O(log M) step.

The invention allows the parallel detection for every pixel (x,y) of an $M \times M$ image whether the pixel is inside or outside of a band where the band is formed by two parallel lines.

The invention allows the parallel detection for every pixel (x,y) of an $M \times M$ image whether the pixel is inside or outside of a polygon.

The invention can be generalized for 3D mesh (physical cube) to form the higher-dimension-extension of the twelve patterns by adding a register Z, a shift register SRZ and a flag F3 to the connection control mechanism. (e.g. The higher-dimension extension of a cube is a 4D hypercube.)

The 3D image element is the voxel. The voxel is the volume element, analogous to the 2D pixel, which has area only. The 3D extension of the invention allows the parallel detection for each voxel (x,y,z) whether the voxel is inside or outside of (a) a region formed by two parallel planes, (b) a polyhedron, or (c) whether the voxel is on, to the left or to the right of a plane.

The invention applies the concept of "polymorphic" to a physical mesh via a "connection control mechanism." The same concept and mechanism can be generalized to other physically-fixed connections. The pattern formed by the polymorphic mesh can be adaptive to the nature of the data by loading the F1 and/or F2 registers via the output of ALU.

Arbitrary patterns can be formed by the polymorphic mesh by setting F1 and F2 registers via instruction or memory. The instruction, the memory value, intermediate processing values from a neighboring processing element, and diagnostic information within the processing element are representative system operation parameters which may be used to set the flag registers, by well known techniques and simple means not shown. The connection control mechanism thus comprises flag register means, which flag register means is settable as a function of system operation parameters, to provide control information usable in setting a new pattern into at least one of the pattern registers. This capability, accessible to the programmer, permits the programmer to set up adaptation to data-related and condition-related future event possibilities. Upon occurrence of such an event, a flag register is set, and a new pattern fetched or calculated in response.

Thus, while the invention has been described with reference to a preferred embodiment, it will be understood by those skilled in the art that various changes in form and details may be made without departing from the scope of the invention.

What is claimed is:

1. An optimizable reconfigurable array processing system for performing under programmable control a series of programmably defined tasks upon input images, having differing optimal system configurations as a composite function of task definition and image input, so that at differing times under differing conditions there are identifiable differing optimal configurations, comprising:
   system control means (3) including operator input means, image input means and operation control means,
   an array of polymorphic mesh processing elements (2) each element being connected to a limited number of neighboring processing elements in said array, each processing element comprising:
   a memory (7);
   an ALU (6) connected to said memory; and connection control mechanism (8), with a finite number of simple connection paths to said ALU (6) and to a related subset of said array of polymorphic mesh processing elements (2), with means to form selective internal and external interconnections of the polymorphic mesh processing elements for communication to a non-Cartesian destination through a plurality of processing elements within one cycle according to a connection control pattern, and
   means (21, 22, 23) to provide a connection control pattern.

2. An optimizable reconfigurable array processing system according to claim 1, wherein said means to provide a connection control pattern comprises pattern presentation means (21, 22) for making available to a processing element a surplus of pattern bit values defining a standard set of pattern values and an alternate set of pattern values, and pattern value selection means (23) for selecting said standard set of pattern values or said alternate set of pattern values,
   and said connection control mechanism comprising switching means (10) responsive to the selected pattern values.

3. An optimizable reconfigurable array processing system according to claim 2, wherein said means to form selective internal and external interconnections includes gate switching means (16-20) settable responsive to the selected pattern values.

4. An optimizable reconfigurable array processing system according to claim 3, wherein said pattern value selection means is a binary device.

5. An optimizable reconfigurable array processing system according to claim 3, wherein said connection control mechanism further comprises flag register means (31,32), said flag register means being settable as a function of system operation parameters, to provide control information usable in setting a new pattern into at least one of said pattern presentation means.

6. A dynamically optimizable reconfigurable array processing system comprising:
   system control means including operator input means, image input means, operation control means;
   operation monitoring means controlling overall system operation, simultaneously monitoring so as to determine optimal system configuration as a composite function of operator input means and operation monitoring means and providing a signal defining an optimal configuration selection;
   an array of polymorphic mesh processing elements, each having a memory and an ALU, and each having a finite number of connections paths to related polymorphic mesh processing elements, each having a polymorphic mesh connection control block having capability to form selective interconnection of the polymorphic mesh processing element by short-circuiting selected connection paths through a plurality of processing elements within one cycle, and by selecting a logical connective, and
   means connecting said optimal configuration selection signal to said polymorphic mesh connection control block for permitting connection between processing elements which are neither in the same column nor in the same row.

7. A processing element for a dynamically optimizable reconfigurable array processing system comprising a multiplicity of processing elements generally controlled by a host computer to carry out image processing as a network, comprising:
   memory means;
   processing means;
   I/O connection means;
   internal connection means;
   connection control means controlling the relationships of said other means in accordance with a control pattern including selectively short-circuiting selected said I/O connection means, thereby enabling connection between non-Cartesian processing elements through a plurality of processing elements within one cycle; and
   means to alter the control pattern in said connection control means.

8. A processing element for a dynamically optimizable reconfigurable array processing system according to claim 7, wherein said means to alter the control pattern in said connection control means is means responsive to intermediate level processing in a related processing element.

9. A processing element for a dynamically optimizable reconfigurable array processing system according to claim 7, wherein said means to alter the control pattern in said connection control means is means responsive to fault indication in a related processing element.

10. A processing element for a dynamically optimizable reconfigurable array processing system according to claim 7, comprising in addition external memory data connection means (EMD 102) connecting to said memory means, processing means and connection control means (8).

11. A processing element for a dynamically optimizable reconfigurable array processing system according to claim 10, further comprising a multiplexer and a plurality of bus connections for said external memory data connection to said memory means, said processing means and said connection control mechanism, whereby said processing element may be operating local memory and external memory simultaneously.

* * * * *